US008819792B2

(12) United States Patent
Adams

(10) Patent No.: US 8,819,792 B2
(45) Date of Patent: Aug. 26, 2014

(54) ASSIGNMENT AND DISTRIBUTION OF ACCESS CREDENTIALS TO MOBILE COMMUNICATION DEVICES

(75) Inventor: Neil Patrick Adams, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 483 days.

(21) Appl. No.: 13/093,898

(22) Filed: Apr. 26, 2011

(65) Prior Publication Data
US 2011/0271331 A1 Nov. 3, 2011

Related U.S. Application Data

(60) Provisional application No. 61/329,552, filed on Apr. 29, 2010.

(51) Int. Cl.
*G06F 7/04* (2006.01)
*H04W 92/18* (2009.01)
*H04W 88/04* (2009.01)
*H04L 9/32* (2006.01)
*H04L 29/06* (2006.01)

(52) U.S. Cl.
CPC .............. *H04W 92/18* (2013.01); *H04W 88/04* (2013.01); *H04L 9/32* (2013.01); *H04L 63/0492* (2013.01); *H04L 63/10* (2013.01)
USPC ................... 726/6; 726/4; 709/229; 713/171; 455/41.1; 455/456.6

(58) Field of Classification Search
CPC ....... H04L 9/32; H04L 63/0492; H04L 63/10; H04W 88/04; H04W 92/18
USPC ........... 455/415, 41.1, 456.6; 726/4; 235/492; 713/171, 168; 709/229
See application file for complete search history.

(56) References Cited

U.S. PATENT DOCUMENTS

| 4,170,998 A | 10/1979 | Sauder |
| 5,721,781 A | 2/1998 | Deo et al. |

(Continued)

FOREIGN PATENT DOCUMENTS

| EP | 1633100 | 3/2006 |
| EP | 2140717 | 1/2010 |

(Continued)

OTHER PUBLICATIONS

Othman, H.; et al.; "Forming Virtualized Secure Framework for Location Based Services (LBS) using Direct Anonymous Attestation (DAA) protocol"; Wireless and Mobile Computing, Networking and Communications (WiMob), 2010 IEEE 6th International Conference on Digital Object Identifier: 10.1109/WIMOB.2010.5644999 Publication Year: 2010 , pp. 622.*

(Continued)

*Primary Examiner* — Pramila Parthasarathy
*Assistant Examiner* — Angela Holmes
(74) *Attorney, Agent, or Firm* — Integral Intellectual Property Inc.; Miriam Paton

(57) ABSTRACT

A server storing a pool of unassigned access credentials selects an access credential from the pool, assigns it to an individual, identifies a mobile communication device associated with the individual, and pushes the access credential to the mobile communication device over a secure and authenticated channel such that the access credential is receivable by the mobile communication device. If the mobile communication device supports a proximity technology and is proximate to an access node that supports the proximity technology, the mobile communication device employs the proximity technology to present the access credential to the access node.

22 Claims, 15 Drawing Sheets

(56) References Cited

U.S. PATENT DOCUMENTS

| | | |
|---|---|---|
| 6,192,131 B1 | 2/2001 | Geer et al. |
| 6,317,829 B1 | 11/2001 | Van Oorschot |
| 6,345,098 B1 | 2/2002 | Matyas et al. |
| 6,460,138 B1 | 10/2002 | Morris |
| 6,539,093 B1 | 3/2003 | Asad et al. |
| 6,611,863 B1 | 8/2003 | Banginwar |
| 6,643,751 B2 | 11/2003 | Rosenquist et al. |
| 6,751,659 B1 | 6/2004 | Fenger et al. |
| 6,772,225 B1 | 8/2004 | Jennings, III et al. |
| 6,810,479 B1 | 10/2004 | Barlow et al. |
| 6,816,900 B1 | 11/2004 | Vogel et al. |
| 6,942,147 B2 | 9/2005 | Lahteenmaki et al. |
| 7,016,666 B2 | 3/2006 | Lauper et al. |
| 7,035,259 B2 | 4/2006 | Nomura et al. |
| 7,039,802 B1 | 5/2006 | Eskicioglu et al. |
| 7,082,102 B1 | 7/2006 | Wright |
| 7,096,204 B1 | 8/2006 | Chen et al. |
| 7,096,495 B1 | 8/2006 | Warrier et al. |
| 7,114,178 B2 | 9/2006 | Dent et al. |
| 7,124,938 B1 | 10/2006 | Marsh |
| 7,170,998 B2 | 1/2007 | McLintock et al. |
| 7,213,068 B1 | 5/2007 | Kohli et al. |
| 7,243,230 B2 | 7/2007 | England et al. |
| 7,290,146 B2 | 10/2007 | Ekers et al. |
| 7,296,149 B2 | 11/2007 | Hiltgen |
| 7,308,706 B2 | 12/2007 | Markham et al. |
| 7,340,531 B2 | 3/2008 | Rasheed et al. |
| 7,356,539 B2 | 4/2008 | Brown et al. |
| 7,374,100 B2 * | 5/2008 | Jei et al. .................. 235/492 |
| 7,660,803 B2 | 2/2010 | Jin |
| 7,882,274 B2 | 2/2011 | Peterson |
| 7,907,896 B2 * | 3/2011 | Chitti .................. 455/41.1 |
| 7,937,704 B2 | 5/2011 | McKee |
| 7,954,144 B1 | 5/2011 | Ebrahimi |
| 2001/0019554 A1 | 9/2001 | Nomura et al. |
| 2001/0019954 A1 | 9/2001 | Lim et al. |
| 2002/0026578 A1 | 2/2002 | Hamann et al. |
| 2002/0165006 A1 | 11/2002 | Haller et al. |
| 2003/0041244 A1 | 2/2003 | Buttyan et al. |
| 2003/0126236 A1 | 7/2003 | Marl et al. |
| 2003/0195957 A1 | 10/2003 | Banginwar |
| 2003/0217166 A1 | 11/2003 | Dal Canto et al. |
| 2004/0083382 A1 | 4/2004 | Markham et al. |
| 2004/0260760 A1 | 12/2004 | Curnyn |
| 2005/0008163 A1 | 1/2005 | Leser et al. |
| 2005/0028006 A1 | 2/2005 | Leser et al. |
| 2005/0039019 A1 | 2/2005 | Delany |
| 2005/0086175 A1 | 4/2005 | Brique et al. |
| 2005/0120106 A1 | 6/2005 | Albertao |
| 2005/0138387 A1 | 6/2005 | Lam et al. |
| 2005/0273850 A1 | 12/2005 | Freund |
| 2006/0047962 A1 | 3/2006 | Adams et al. |
| 2006/0072456 A1 | 4/2006 | Chari et al. |
| 2006/0183462 A1 | 8/2006 | Kolehmainen |
| 2006/0213982 A1 | 9/2006 | Cannon et al. |
| 2006/0218396 A1 | 9/2006 | Laitinen |
| 2006/0224742 A1 | 10/2006 | Shahbazi |
| 2006/0236117 A1 | 10/2006 | Lazaridis et al. |
| 2006/0286969 A1 * | 12/2006 | Talmor et al. .................. 455/415 |
| 2007/0057057 A1 | 3/2007 | Andresky et al. |
| 2007/0180499 A1 * | 8/2007 | Van Bemmel .................. 726/4 |
| 2007/0192610 A1 | 8/2007 | Chun et al. |
| 2007/0300059 A1 | 12/2007 | Yoneda |
| 2008/0046739 A1 | 2/2008 | Adams et al. |
| 2009/0093247 A1 * | 4/2009 | Srinivasan .................. 455/433 |
| 2009/0158032 A1 | 6/2009 | Costa |
| 2009/0199001 A1 | 8/2009 | Barriga |
| 2010/0077466 A1 | 3/2010 | Lowe |
| 2011/0167470 A1 | 7/2011 | Walker et al. |

FOREIGN PATENT DOCUMENTS

| | | |
|---|---|---|
| WO | 0127821 | 4/2001 |
| WO | 03028313 | 4/2003 |
| WO | 2005048524 | 5/2005 |
| WO | 2005106618 | 11/2005 |

OTHER PUBLICATIONS

Singh Ghotra, S. ; et al; "Secure Display and Secure Transactions Using a Handset"; Management of Mobile Business, 2007. ICMB 2007. International Conference on the Digital Object Identifier: 10.1109/ICMB.2007.56 ; Publication Year: 2007 , pp. 51.*

Ghayour, Mehdi, Second Office Action for CA 2,593,977, May 31, 2012.

Zia, Syed, Notice of Allowance for U.S. Appl. No. 12/058,684, May 15, 2012.

Shaw, Yin Chen, Fifth Office Action for U.S. Appl. No. 11/464,900, Jul. 18, 2011.

Zia, Syed , Third Office Action for U.S. Appl. No. 12/058,684 Jul. 14, 2011.

Zia, Syed , Second Office Action for U.S. Appl. No. 12/058,684, Apr. 5, 2011.

HID Global , "HID Virtual Products—idBank", 2008.

HID Corp., "How an HID Card is "Read"", 2005.

Smart Card Alliance, "RFID Tags and Contactless Smart Card Technology: Comparing and Contrasting Applications and Capabilities, Apr. 28, 2005".

HID Corp., "Smart Cards for Access Control Advantages and Technology Choices", Smart Cards for Access Control Advantages and Technology Choices, published 2005.

Beatty, John, Second Examination Report for EPO 06119048.4, Mar. 18, 2009.

Beatty, John, Third Exam Report for EP 06119048.4, Mar. 16, 2011.

Beatty, John, Extended European Search Report for EP 06119048.4, Dec. 28, 2006.

Chan, K. et al., "COPS Usage for Policy Provisioning (COPS-PR)", Mar. 2001.

Ekberg, Jan-Erik et al., Nokia Research Center, "On-board Credentials with Open Provisioning", Aug. 29, 2008.

Gai, Silvano et al., "QoS Policy Framework Architecture", IETF Standard-working-draft, Internet Engineering Task Force, IETF, CH, XP015035137 ISSN: 0000-0004 chapters 2, 2.1, 2.1.5, 2.1.2.1, 2.3, 2.3.3, 4.2, 6, 1-16 Feb. 10, 1999.

IBM, "Tivoli Access Manager, Base Installation Guide, version 5.1", chapter 1, p. 7 Nov. 2003.

Kim, Chong Hwa , First Office Action for U.S. Appl. No. 11/097,356, Jul. 6, 2007.

Mian, Ali , First Office Action for CA 2,539,998, May 14, 2010.

Phanse, K S. et al., "Design and demonstration of policy-based management in a multi-hop ad hoc network", AD HOC Networks, Elsevier, vol. 3, No. 3, pp. 389-401 XP004848804 ISSN: 1570-8705, 1-16, Nov. 29, 2003.

Rosken, Wilfried , Examination Report for EP 05102623.5, Nov. 22, 2006.

Rosken, W , Extended European Search Report for EP 05102623.5, Oct. 5, 2005.

Shaw, Yin-Chen , Advisory action for U.S. Appl. No. 11/464,900, Dec. 9, 2010.

Shaw, Yin-Chen , First Office Action for U.S. Appl. No. 11/464,900, Feb. 5, 2010.

Shaw, Yin-Chen , Fourth Office Action for U.S. Appl. No. 11/464,900, Jan. 25, 2011.

Shaw, Yin-Chen , Second Office Action for U.S. Appl. No. 11/464,900, Jul. 20, 2010.

Shreih, Raghid , First Office Action for CA 2,593,977, Oct. 7, 2010.

Smart Card Alliance, Using Smart Cards for Secure Physical Access, publication number: ID-03003, Jul. 2003.

Zia, Syed , First Office Action for U.S. Appl. No. 12/058,684, Jan. 6, 2011.

Zia, Syed , Fourth Office Action for U.S. Appl. No. 12/058,684, Dec. 1, 2011.

(56) References Cited

OTHER PUBLICATIONS

Shaw, Yin-Chen, Sixth Office Action for U.S. Appl. No. 11/464,900, Jan. 9, 2012.
Vaughan, Michael R., First Office Action for U.S. Appl. No. 13/570,709, Jan. 14, 2013.
Vaughan, Michael R., Second Office Action for U.S. Appl. No. 13/570,709, Aug. 2, 2013.
Oliveira, Joel, Extended European Search Report for EP 11163667.6, Mar. 7, 2014.
Siddiqui, Imran, First Office Action for CA 2,738,157, Dec. 16, 2013.
Vaughan, Michael R., Third Office Action for U.S. Appl. No. 13/570,709, Feb. 4, 2014.
Wang, Wei, Third Office Action CA2,593,977 Jan 9, 2014.
Vaughan, Michael R., Fourth Office Action for U.S. Appl. No. 13/570,709, May 21, 2014.

* cited by examiner

ASSIGNMENT AND DISTRIBUTION OF ACCESS CREDENTIALS TO MOBILE COMMUNICATION DEVICES

CROSS-REFERENCE TO RELATED APPLICATIONS

This application claims the benefit under 35 U.S.C. 119(e) from U.S. Provisional Application No. 61/329,552 filed Apr. 29, 2010 and entitled "Assignment and Distribution of Access Credentials to Mobile Communication Devices", the contents of which are incorporated by reference herein.

BACKGROUND

Provisioning physical access credentials or logical access credentials or both to physical tokens incurs a heavy logistical burden.

Smart cards are increasingly accepted as the physical token of choice for securely controlling physical access. A report entitled "Using smart Cards for Secure Physical Access" from Smart Card Alliance of New Jersey, USA, published in July 2003, provides a primer on smart card-based physical access ID systems. When such a system is to be implemented in an organization, the smart cards must be issued and deployed to the users of the system. Various costs are necessarily incurred, including, for example, the cost of the smart cards, planning of the system, manned issuance stations, coordination of users to get to the manned issuance stations, the loss of productivity and other costs incurred by users to travel to the manned issuance stations.

HID Global® of California, USA provides idBank™ smart cards that contain hundreds or thousands of electronic access credentials. Privaris Inc. of Virginia, USA produces plusID™ personal biometric fingerprint tokens with a keyfob-like form factor. Credentials from an idBank™ smart card can be provisioned to a plusID™ token when the token is physically presented to a personal computer upon which an enrolling application is installed.

BRIEF DESCRIPTION OF THE DRAWINGS

The technology will now be described by way of example only with reference to the attached drawings, in which:

FIG. 2 is an illustration of a mobile communication device in the possession of an individual, proximate to an access node;

FIG. 3 is an illustration of a mobile communication device and a secondary device, both in the possession of an individual, proximate to an access node;

FIG. 4 is an example block diagram of a server;

FIGS. 5-1 and 5-2 are illustrations of example methods to be performed by a server in communication with a mobile communication device;

FIGS. 7-1 and 7-2 are illustrations of example methods to be performed by a server;

Figure 1:
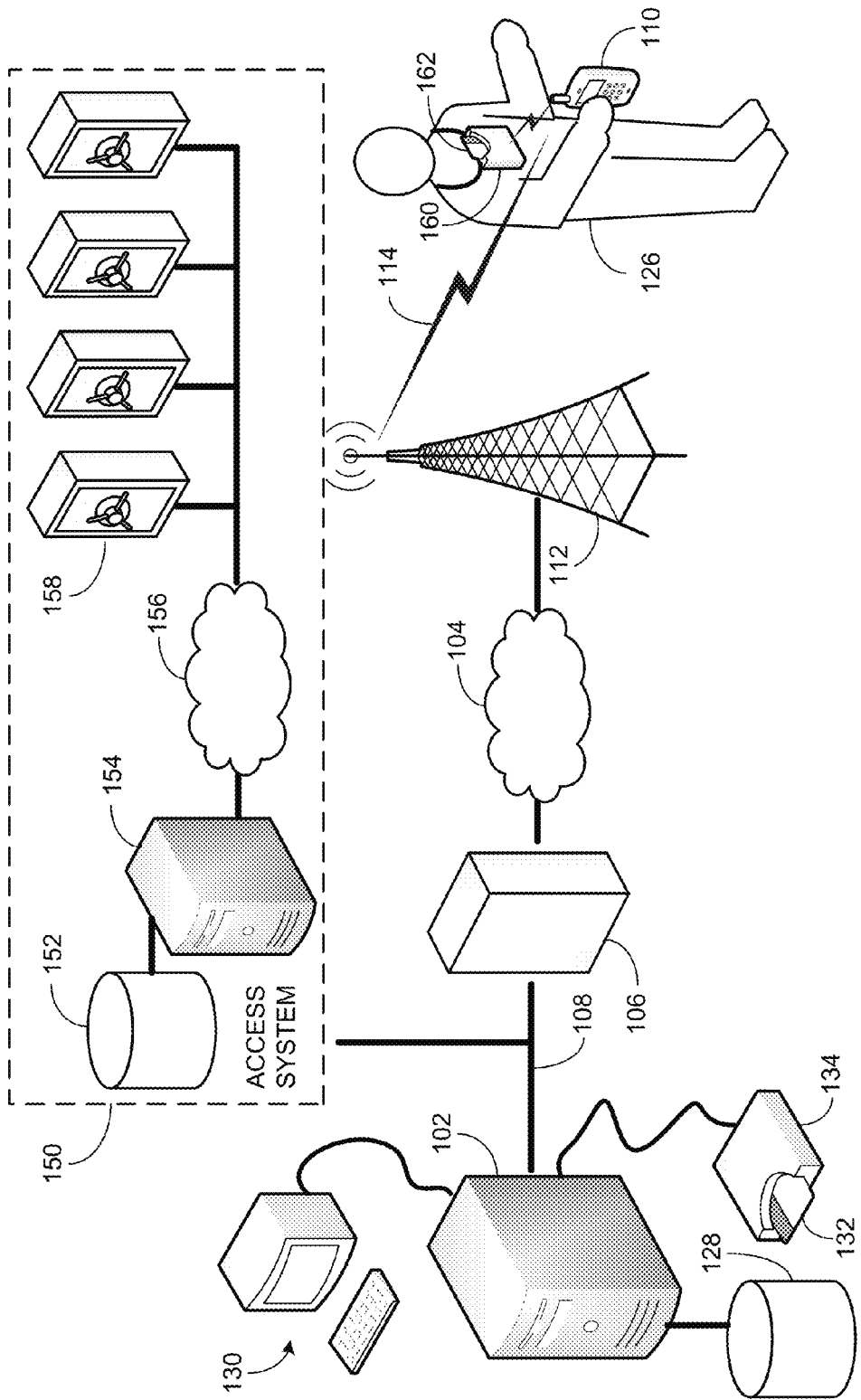
FIGS. 1-1, 1-2, 1-3, and 1-4 are illustrations of example systems for the assignment and distribution of access credentials to mobile communication devices.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Reference is made to FIGS. 1-1, 1-2, 1-3, and 1-4, in which example systems for the assignment and distribution of access credentials to mobile communication devices are illustrated.

A server 102 is coupled to a network 104 via a firewall 106. Network 104 may comprise, for example, the Internet. An internal network 108 couples server 102 to firewall 106. Server 102 and a mobile communication device 110 are able to create a secure and authenticated channel therebetween, using encryption and authentication techniques. Precisely what is encompassed by the secure and authenticated channel will depend on how the channel is created, which in turn depends on capabilities of mobile communication device 110 and what connections mobile communication device 110 has made.

In one example, mobile communication device 110 may authenticate itself to server 102 by transmitting to server 102 an identifier of mobile communication device 110, such as DeviceID, and a password. The identification may be automatically retrieved by mobile communication device 110 from its storage, for example, a register that stores DeviceID, or manually entered by a user of mobile communication device 110. The password, which may also be entered by the user, may be obtained by contacting a system administrator for server 102, may be obtained from information provided with the purchase of mobile communication device 110, or may be obtained using some other means. Server 102 may authenticate mobile communication device 110 by checking the validity of the received password. Similarly, server 102 may authenticate itself to mobile communication device 110 by transmitting a network identification and the password to mobile communication device 110 for verification. In this manner, an authenticated channel may be created between mobile communication device 110 and server 102. Other authentication procedures are also contemplated. For example, it is known in the art for two parties to prove to each other that they share a password without the password actually being transmitted from one party to the other over an insecure unauthenticated channel.

Encryption may be used to secure the authenticated channel between mobile communication device 110 and server 102. For example, mobile communication device 110 and server 102 may exchange public keys over the authenticated channel, the public keys to be used for encrypting messages for transmission to each other. Mobile communication device 110 may use its private key to decrypt messages received from server 102, while server 102 may use its private key to decrypt message received from mobile communication device 110. In this manner, a secure and authenticated channel may be created between mobile communication device 110 and server 102.

In the system illustrated in FIG. 1-1, for example, mobile communication device 110 may comprise a wireless wide area network (WWAN) communication interface or a wireless metropolitan area network (WMAN) communication interface that enables mobile communication device 110 to communicate with a base station 112 when mobile communication device 110 is within range of base station 112. The term "base station" is intended to encompass nodes of a wireless network that are capable of communication with a mobile communication device over a wireless link, and includes, for example, a base station of a cellular network, and a Head End of a WMAN. In this example, the secure and authenticated channel encompasses internal network 108, network 104, the network connecting base station 112 to network 104, and a wireless link 114 between base station 112 and mobile communication device 110.

Figures 1, 2:
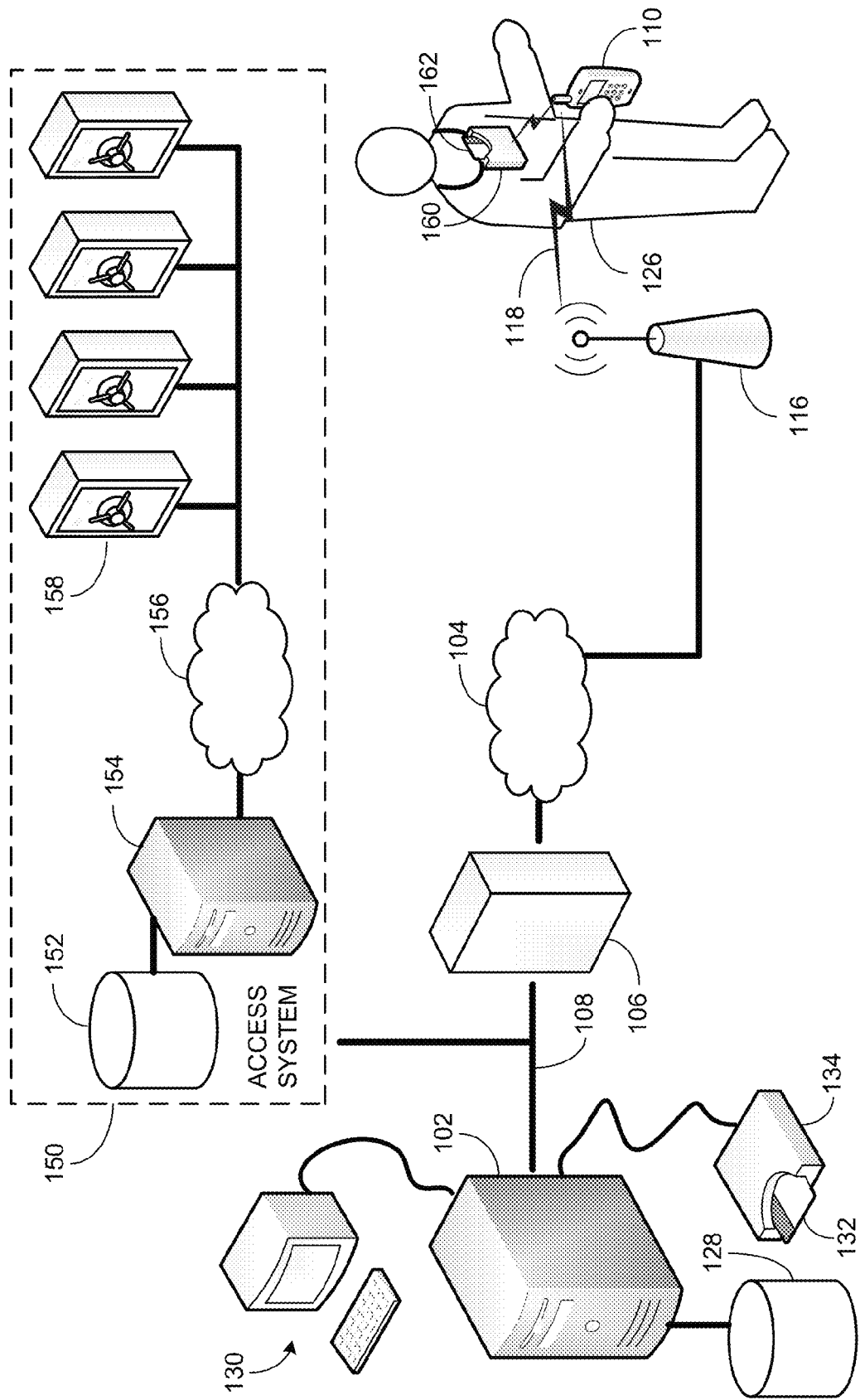

In the system illustrated in FIG. 1-2, for example, mobile communication device 110 may comprise a wireless local area network (WLAN) communication interface that enables mobile communication device 110 to communicate with a WLAN access point 116 when mobile communication device 110 is within range of WLAN access point 116. In this example, the secure and authenticated channel encompasses internal network 108, network 104, the network connecting WLAN access point 116 to network 104, and a wireless link 118 between WLAN access point 116 and mobile communication device 110.

Figures 1, 2, 3:
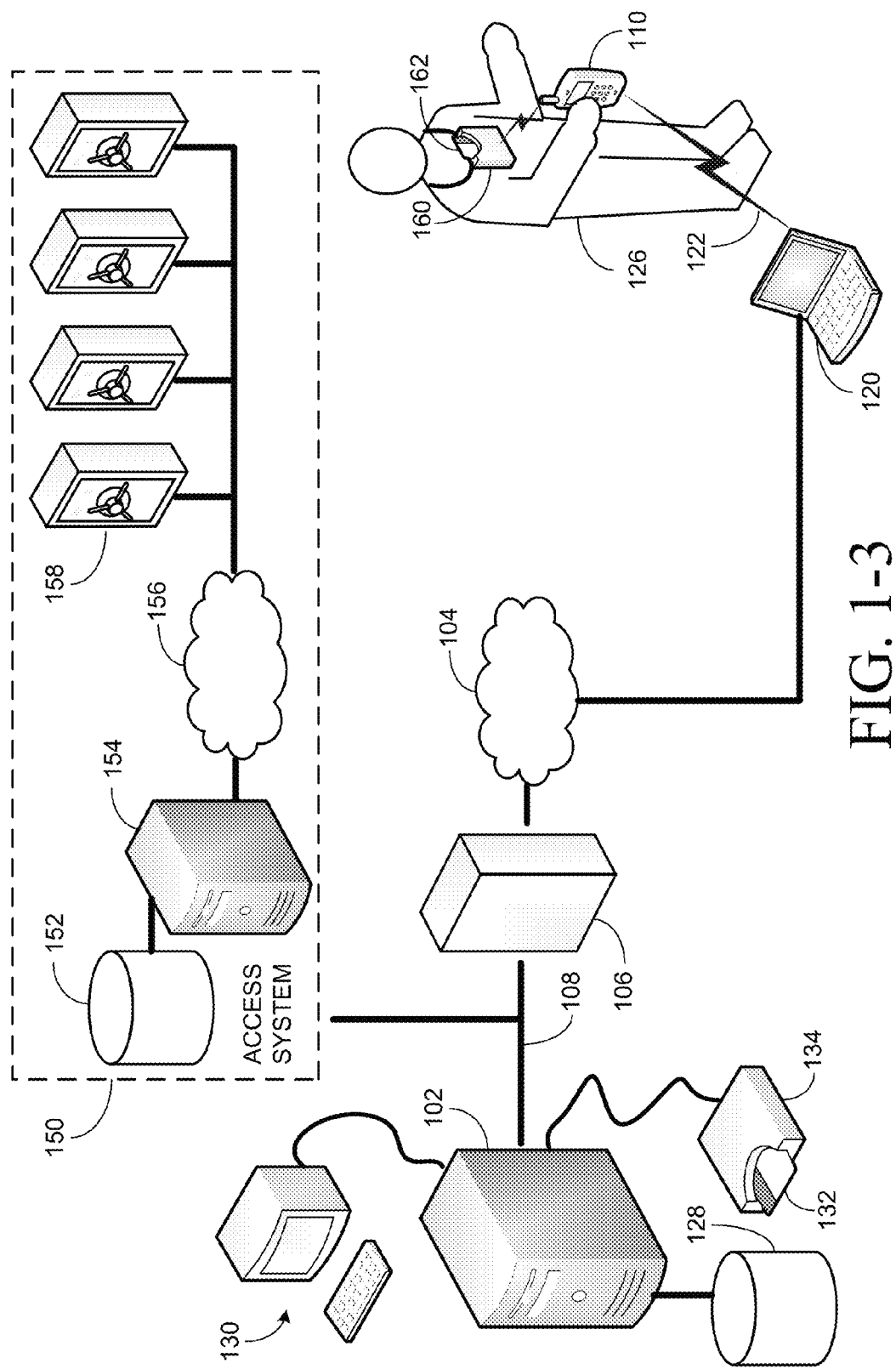

In the system illustrated in FIG. 1-3, for example, mobile communication device 110 may comprise a wireless personal area network (WPAN) communication interface that enables mobile communication device 110 to communicate with another WPAN device, for example, a personal computer 120, when mobile communication device 110 is within range of the other WPAN device. In this example, the secure and authenticated channel encompasses internal network 108, network 104, the network connecting the WPAN device to network 104, and a wireless link 122 between the WPAN device and mobile communication device 110.

In the system illustrated in FIG. 1-4, for example, personal computer 120 and mobile communication device 110 may be connectable via a direct wired link 124 such as universal serial bus (USB), and personal computer 120 may have installed thereon an application that acts as an intermediary between mobile communication device 110 and server 102 and facilitates communication therebetween. In this example, the secure and authenticated channel encompasses internal network 108, network 104, the network connecting personal computer 120 to network 104, and direct wired link 124 between personal computer 120 and mobile communication device 110.

Server 102 is able to identify a mobile communication device 110 that is associated with a specific individual 126. For example, server 102 may store or have access to a device database 128 with records in the form UserID-DeviceID, enabling server 102, given the UserID of a specific individual, to look up the DeviceID of a mobile communication device that is associated with the specific individual. If two or more mobile communication devices are associated with the same individual, this may be reflected in two or more records in device database 128 in the form UserID-DeviceID_1; UserID-DeviceID_2; etc. If a mobile communication device is shared among two or more individuals, this may be reflected in two or more records in device database 128 in the form UserID_1-DeviceID; UserID_2-DeviceID; etc.

A terminal 130 coupled to server 102 enables a system administrator (not shown) to add users to device database 128, to delete users from device database 128, to add mobile communication devices to device database 128, to delete mobile communication devices from device database 128, and to modify the association of mobile communication devices and users in device database 128.

Server 102 stores a set (not shown) of unassigned access credentials, denoted the "pool" of unassigned access credentials. The unassigned access credentials may be imported into the pool from an external source of unassigned access credentials. For example, an external source of unassigned access credentials may comprise a smart card 132. HID Global® of California, USA provides idBank™ smart cards that contain hundreds or thousands of electronic access credentials. By coupling a smart card reader 134 to server 102 and inserting smart card 132 into smart card reader 134 (or otherwise enabling smart card reader 134 to read smart card 132), unassigned access credentials stored in smart card 132 may be copied to server 102 and incorporated into the pool.

A system administrator using terminal 130 may indicate to server 102 that certain individuals are to participate in access control using their associated mobile communication devices. An individual may be deemed a participant based on his or her identity. Alternatively, an individual may be deemed a participant based on his or her inclusion in a group, where the indication is that the group is to participate.

Consider, for example, that specific individual 126 has been deemed a participant. Server 102 selects an access credential from its pool of unassigned access credentials, assigns the access credential to specific individual 126, identifies that mobile communication device 100 is associated with specific individual 126, and pushes the access credential to the mobile communication device 110 over the secure and authenticated channel. Server 102 also informs an access system 150 of the assignment of the access credential to specific individual 126. Once an access credential has been assigned to an individual, that access credential is no longer in the pool of unassigned access credentials. If the indication received by the server is that a group is to participate, then this sequence of actions is repeated—each time with a different access credential—for each of the individuals included in the group.

The assignment of an access credential to an individual may be stored in server 102 or in device database 128, for example, in a record in the form UserID-Credential.

The precise implementation of access system 150 is beyond the scope of this disclosure, and the following discussion is of an example access system. In common implementations, access system 150 comprises at least an access database 152, an access server 154, and access nodes that are able to communicate with access server 154 via a secure network 156. Each access node controls access to a controlled element (not shown). In the example of a door, the controlled element may be the door's lock. In the example of a computer, the controlled element may be an application running on the computer—a login application, an application to approve administrative privileges on the computer, or any other application. In the example of a car's ignition system, the controlled element may be responsible for igniting the car. In the example of an elevator, the controlled element may be a motor responsible for moving the elevator.

If the access nodes of access system 150 control access only to physical elements, then access system 150 is a "physical access control (PAC) system" and the access credentials are "physical access credentials". If the access nodes of access system 150 control access only to logical elements, then access system 150 is a "logical access control system" and the access credentials are "logical access credentials".

Access database 152 stores updated information on the access rights of users of access system 150. For example, access database 152 may store records in the form UserID-Credential and AccessNodeID-UserID-(additional conditions).

In a centralized access system, an access node, when presented with an access credential, transmits data over secure network 156 to access server 154. Access server 154 compares the data received from the access node to information stored in access database 152. For example, access control software installed on access server 154 may determine the user's access privileges and authorization, the time and date of the attempted access, and any other information that may be required to ensure security. If access server 154 determines that access should be permitted, access server 154 sends an access-permitted signal over secure network 156 to the access node to permit access. If access server 154 determines that access should be denied, access server 154 may send a denial-of-access signal over secure network 156 to the access node to deny access, or alternatively the access node may determine that access has been denied from a failure to receive the access-permitted signal.

In a distributed access system, access server 154 provides the access nodes from time to time with data that enables the access nodes to determine whether a user is authorized for access. When presented with an access credential, an access node compares the access credential with information about the user stored locally at the access node.

Other architectures are also contemplated for access system 150. For example, access database 152 and access server 154 may be replaced by multiple database-server pairs, each pair serving a local group of access nodes and sharing information with other pairs.

Regardless of the architecture of access system 150, access to a controlled element is permitted or denied by access system 150 based, at least in part, on an analysis of the access credential presented to the access node that controls access to the controlled element. Denial of access may be an indication of an attempted breach of security. For example, the device used to present the access credential may have been stolen, and the thief may attempt to access an access node for which the rightful user of the device does not have permission and which the rightful user knows not to try to access. Access system 150 may inform server 102 of the denial of access. Server 102 may take action to protect the device following the denial of access or following a number of consecutive access attempts that are denied. An example action taken by server 102 is to instruct the device to delete its contents. An alternative example action taken by server 102 is to instruct the device to lock itself. Another alternative example action taken by server 102 is to instruct the device to lock itself and to prompt for a password which if not entered accurately within a predefined period of time causes the device to delete its contents.

At least one of the access nodes, referenced 158, supports one or more proximity technologies. A proximity technology has an effect when participants that support the proximity technology are proximate, or near to each other. Just how near the participants need to be for the proximity technology to have an effect will depend on the proximity technology. Examples of proximity technologies include radio frequency identification (RFID), near-field communications (NFC), gate proximity technology, low-rate wireless personal area network (LR-WPAN) technology such as IEEE 802.15.4, and wireless personal area network (WPAN) technology such as Bluetooth®. It is contemplated that some of the access nodes in access system 150 support at least one proximity technology while others of the access nodes in access system 150 support at least a different proximity technology.

Mobile communication device 110 may support one or more proximity technologies and may transmit an indication of which proximity technology or technologies it supports over the secure and authenticated channel to server 102. Server 102, as a result of receiving the indication, may update its information about mobile communication device 110, for example, by adding or updating records in device database 128 related to mobile communication device 110. The proximity technology or technologies supported by mobile communication devices may be identified in device database 128, for example, in records in the form DeviceID-DeviceCapability. It is also contemplated that mobile communication device 110 supports one or more proximity technologies and that this is available to server 102 from DeviceID or other information about mobile communication device 110 in device database 128, without any need for mobile communication device 110 to transmit an indication of this support to server 102.

If a new mobile communication device is a replacement for an older mobile communication device, then server 102 may revoke the access credential pushed to the older mobile communication device, select another access credential from the pool, assign the newly selected access credential to the individual, and push the newly selected access credential to the new mobile communication device. Alternatively, device switch software may be used to transfer an access credential from the older mobile communication device to the new mobile communication device. The transfer may occur over a wireless personal area network or using a microSD (micro Secure Digital) removable flash memory card or in any other suitable manner. If two or more mobile communication devices associated with the individual each support at least one proximity technology, server 102 may push the access credential assigned to the individual to the two or more mobile communication devices. If server 102 has already pushed the access credential assigned to the individual to one or more mobile communication devices and subsequently an additional mobile communication device that supports a proximity technology is associated with the individual, server 102 may push the access credential to the additional mobile communication device. Alternatively, the system administrator may implement a policy of assigning only one access credential per mobile communication device, such that multiple access credentials may be assigned to a particular individual if two or more mobile communication devices that are associated with the individual each support at least one proximity technology.

In some implementations, server 102 may refrain from pushing an access credential that is assigned to an individual to a mobile communication device that is associated with the individual if the mobile communication device does not support any proximity technologies.

Optionally, specific individual 126 may have in his or her possession a secondary device 160. Mobile communication device 110 and secondary device 160 may be able to communicate therebetween, for example, via a wired connection, or via a short-range wireless connection such as Bluetooth®, or via a longer-range wireless connection. It is also contemplated that secondary device 160 is able to receive data from mobile communication device 110 but is not able to transmit.

As illustrated in FIGS. 1-1, 1-2, 1-3 and 1-4, secondary device 160 comprises a wireless smart card reader that is coupled to a smart card 162. However, other secondary devices are also contemplated. A non-exhaustive list of examples for secondary devices includes a security token, a watch, a wristband, another wireless device, a tablet computer, a laptop computer, and the like.

Secondary device 160 supports one or more proximity technologies. Mobile communication device 110 may transmit to server 102 over the secure and authenticated channel an indication that a secondary device is accessible by the mobile communication device and an indication which proximity technology or technologies are supported by the secondary device. Server 102, as a result of receiving the indications, may update its information about mobile communication device 110, for example, by adding or updating records in device database 128 related to mobile communication device 110. The proximity technology or technologies supported by secondary devices accessible by mobile communication devices may be identified in device database 128, for example, in records in the form DeviceID-SecondaryDevice-Capability.

There is an underlying assumption that at least some of the time, mobile communication device 110 and secondary device 160 will both be in the possession of specific individual 126.

As noted above, server 102 may push an access credential that is assigned to an individual to a mobile communication device. Server 102 may also push to the mobile communication device an indication that the access credential is intended for use by the mobile communication device's secondary device, and the mobile communication device may therefore transmit the received access credential to the secondary device. The indication that the access credential is intended for use by the secondary device may originate with the system administrator. Alternatively, the access credential may be pushed to the mobile communication device without such an indication, and if the mobile communication device lacks support for a proximity technology, the mobile communication device may transmit the received access credential to the secondary device. In the event that both the mobile communication device and the secondary device support a proximity technology and the access credential is pushed without an indication of its destination, the mobile communication device may retain the access credential for its sole use, or may transmit the received access credential to the secondary device for its sole use, or both the mobile communication device and the secondary device may use the received access credential.

In some cases, the mobile communication device and the secondary device both support one or more proximity technologies, and the access credential is pushed from server 102 without an indication of whether it is intended for use by the mobile communication device or by the secondary device. In such cases, the mobile communication device may retain the access credential for its sole use, or may transmit the received access credential to the secondary device for its sole use, or may retain the access credential for use by the mobile communication device and may transmit the access credential to the secondary device for use by the secondary device.

It is also contemplated that the mobile communication device supports one or more proximity technologies and the secondary device does not support any proximity technologies, yet the mobile communication device transmits the access credential pushed from server 102 to the secondary device for storage in the secondary device. When the mobile communication device is near an access node that supports the same proximity technology as the mobile communication device, the mobile communication device receives the access credential from the secondary device, stores access credential temporarily, for example, in the mobile communication device's random access memory (RAM), presents the access credential to the access node, and then deletes the access credential from the mobile communication device. This may be suitable when the secondary device is able to store the access credential more securely than the mobile communication device is able to store the access credential.

It is also contemplated the mobile communication device does not support any proximity technologies and the secondary device supports one or more proximity technologies, yet the mobile communication device stores the access credential pushed from server 102. When the secondary device is near an access node that supports the same proximity technology as the secondary device, the secondary device receives the access credential from the mobile communication device, stores access credential temporarily, for example, in the secondary device's random access memory (RAM), presents the access credential to the access node, and then deletes the access credential from the secondary device. This may be suitable when the mobile communication device is able to store the access credential more securely than the secondary device is able to store the access credential.

In some implementations, server 102 may refrain from pushing an access credential that is assigned to an individual to a mobile communication device that is associated with the individual if the mobile communication device does not support any proximity technologies and no secondary device that supports a proximity technology is accessible by the mobile communication device.

Reference is made to FIG. 2, which is an illustration of mobile communication device 110 in the possession of specific individual 126, proximate to access node 158. Mobile communication device 110 stores the access credential assigned by server 102 to specific individual 126 and which was previously pushed to mobile communication device 110 by server 102 and received by mobile communication device 110 over wireless link 114 from base station 108.

In the example illustrated in FIG. 2, mobile communication device 110 supports the same proximity technology that is supported by access node 158. For example, if the proximity technology is RFID, then mobile communication device 110 may comprise an RFID tag and access node 158 may comprise an RFID reader. In another example, if the proximity technology is NFC, then mobile communication device 110 may comprise an NFC component and access node 158 may comprise an NFC component. In a further example, if the proximity technology is LR-WPAN technology such as IEEE 802.15.4, then mobile communication device 110 may comprise a LR-WPAN component, and access node 158 may comprise a LR-WPAN component. In yet another example, if the proximity technology is WPAN technology, then mobile communication device 110 may comprise a WPAN interface and access node 158 may comprise a WPAN interface.

When mobile communication device 110 is proximate to access node 158, mobile communication device 110 employs the proximity technology to present the access credential to access node 158. This is illustrated in FIG. 2 by curved dashed lines 240.

In some implementations, mobile communication device 110 may require successful user authentication in order to permit employing the proximity technology to present the access credential to access node 158. This requirement may be part of an information technology (IT) policy transmitted—upon request or pushed—to mobile communication device 110 by server 102. The user authentication may involve only mobile communication device 110 or may involve a separate authentication device (not shown) or may involve communications with an authentication server (not shown). For example, successful user authentication may involve a secret known to an authorized user of mobile communication device 110. In another example, mobile communication device 110 may comprise a biometric reader or may be coupled to a biometric reader (not shown), and successful user authentication may involve a biometric of an authorized user of mobile communication device 110. It is also contemplated that presentation of the access credential by employing the proximity technology is done independently of user authentication, and that granting of access by access system 150 requires not only on an analysis of the access credential presented to the access node but also successful user authentication.

Reference is made to FIG. 3, which is an illustration of mobile communication device 110 and secondary device 160 in the possession of specific individual 126, proximate to access node 158.

Secondary device 160 stores the access credential assigned by server 102 to specific individual 126. The access credential was previously pushed to mobile communication device 110 by server 102, received by mobile communication device 110 over wireless link 114 from base station 108, and transmitted by mobile communication device 110 to secondary device 160 for use by secondary device 160.

In the example illustrated in FIG. 3, secondary device 160 supports the same proximity technology that is supported by access node 158. For example, if the proximity technology is RFID, then secondary device 160 may comprise an RFID tag and access node 158 may comprise an RFID reader. In another example, if the proximity technology is NFC, then secondary device 160 may comprise an NFC component and access node 158 may comprise an NFC component. In a further example, if the proximity technology is LR-WPAN technology such as IEEE 802.15.4, then secondary device 160 may comprise a LR-WPAN component, and access node 158 may comprise a LR-WPAN component. In yet another example, if the proximity technology is WPAN technology, then secondary device 160 may comprise a WPAN interface and access node 158 may comprise a WPAN interface.

When secondary device 160 is proximate to access node 158, secondary device 160 employs the proximity technology to present the access credential to access node 158. This is illustrated in FIG. 3 by curved dashed lines 340.

In some implementations, secondary device 160 may require successful user authentication in order to permit employing the proximity technology to present the access credential to access node 158. This requirement may be part of an information technology (IT) policy transmitted—upon request or pushed—to mobile communication device 110 by server 102 and subsequently transmitted from mobile communication device 110 to secondary device 160. The user authentication may involve only secondary device 160 or may involve mobile communication device 110 or may involve communications with an authentication server (not shown). For example, successful user authentication may involve a secret known to an authorized user of mobile communication device 110. In another example, secondary device 160 or mobile communication device 110 may comprise a biometric reader or may be coupled to a biometric reader (not shown), and successful user authentication may involve a biometric of an authorized user of secondary device 160 or of mobile communication device 110. It is also contemplated that presentation of the access credential by employing the proximity technology is done independently of user authentication, and that granting of access by access system 150 requires not only on an analysis of the access credential presented to the access node but also successful user authentication.

It should also be noted that although FIG. 3 illustrates both mobile communication device 110 and secondary device 160 in the possession of specific individual 126 when proximate to access node 158, it is also possible that mobile communication device 110 is not the possession of specific individual 126 when secondary device 160 is proximate to access node 158.

Figures 1, 2, 3, 4:
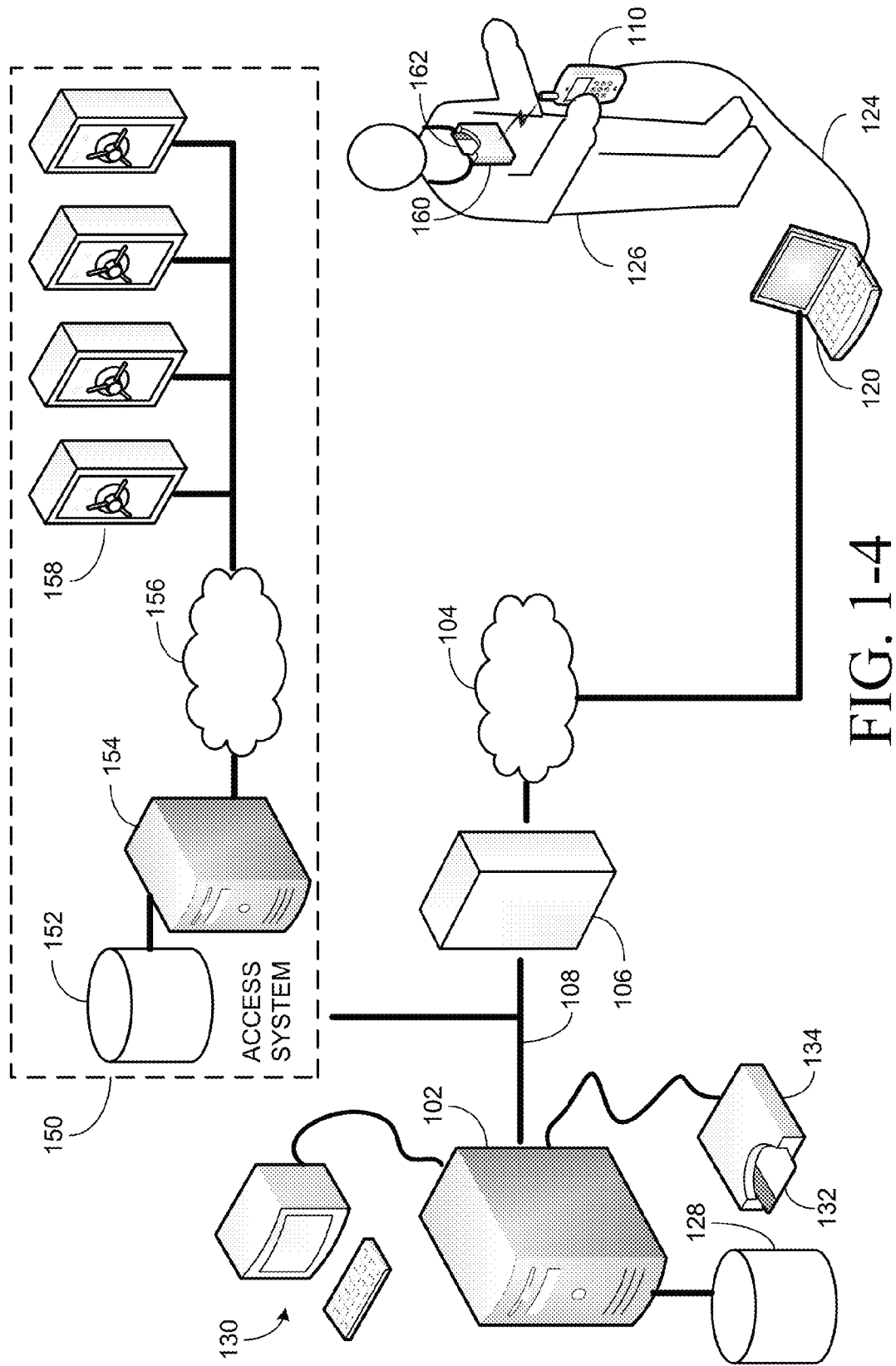
Figure 2:
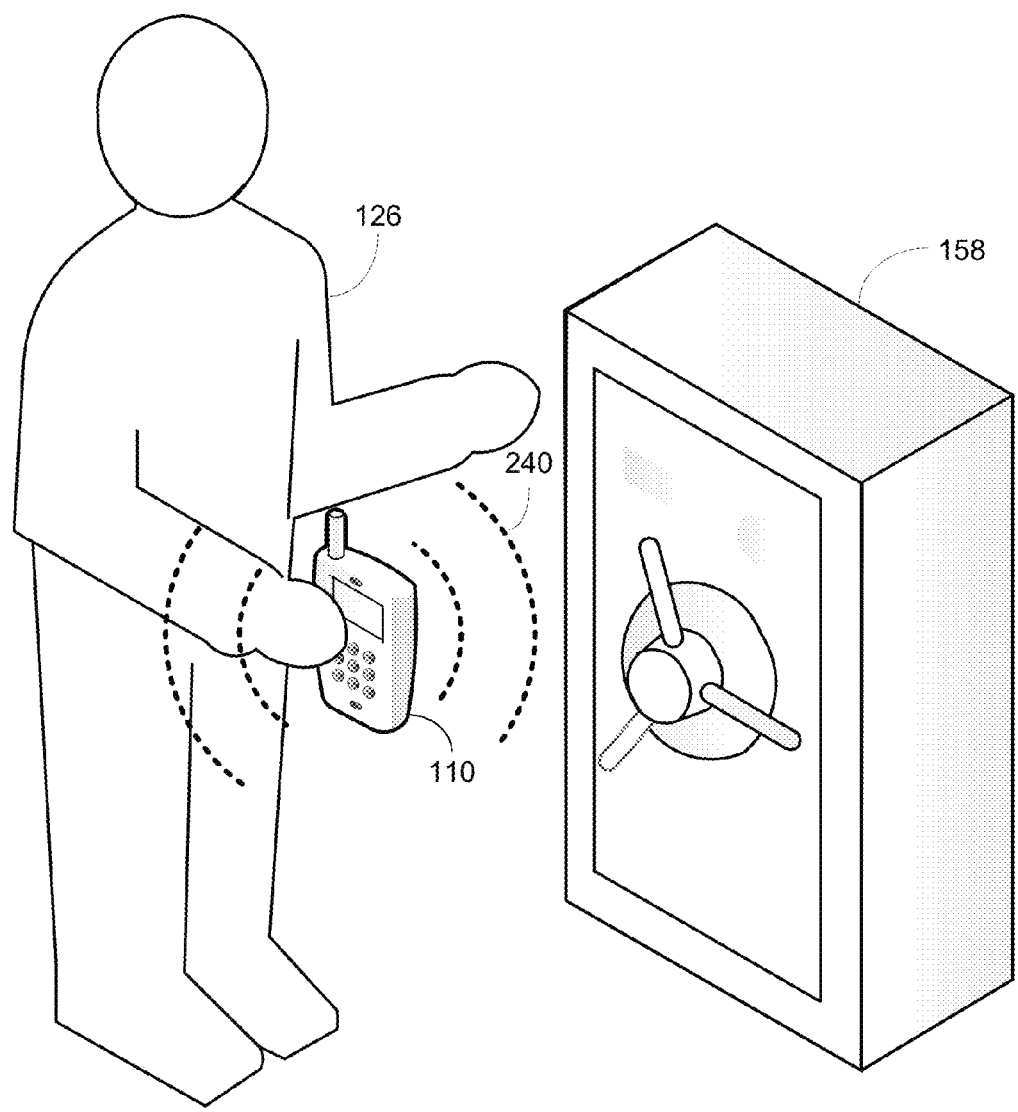
Figure 3:
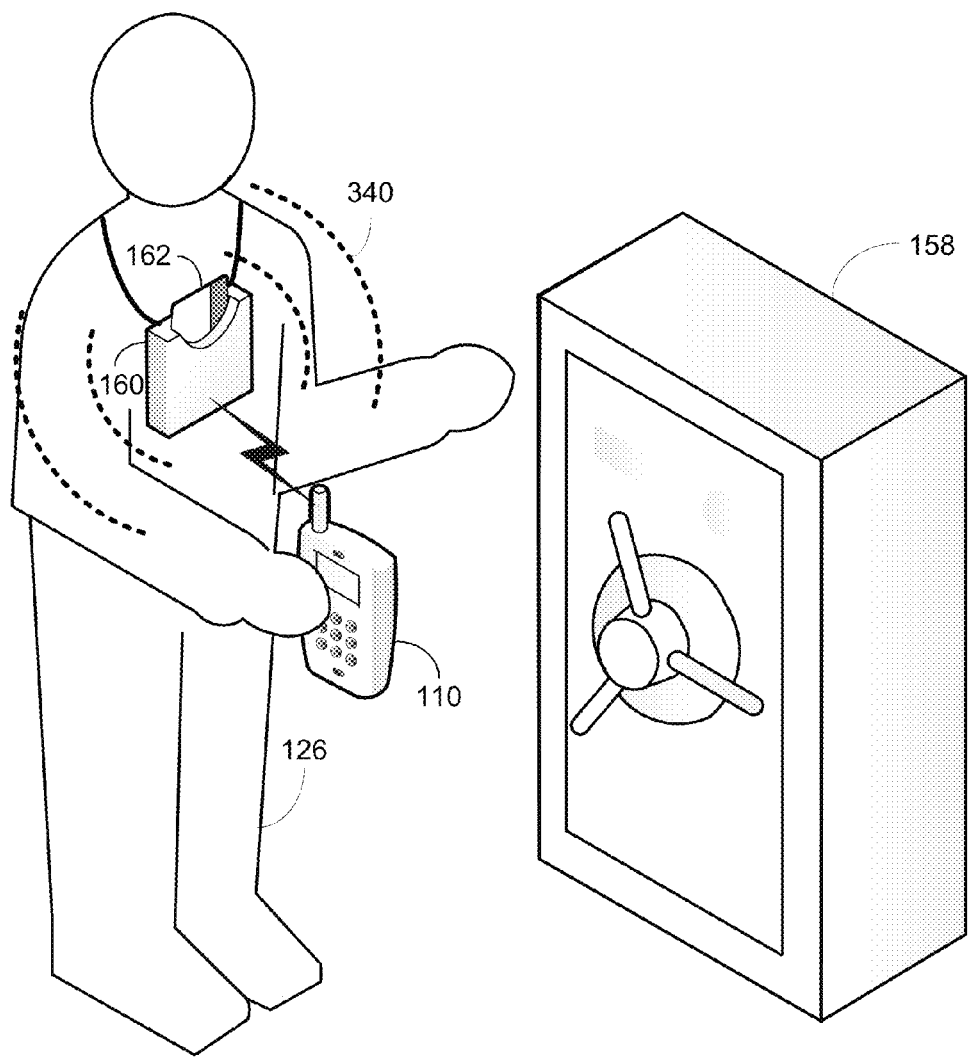
Figure 4:
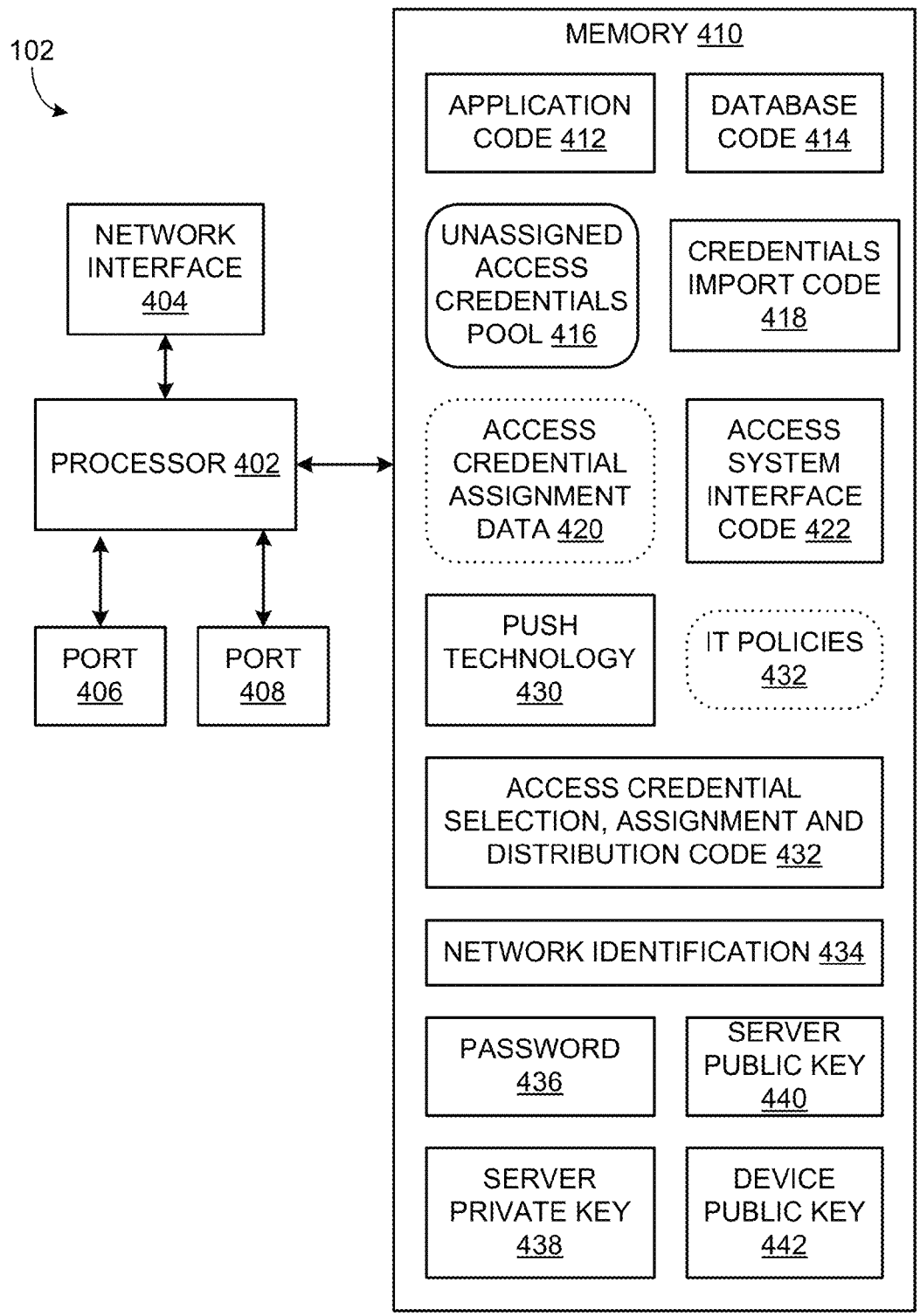

FIG. 4 is an example block diagram of server 102. Server 102 comprises a processor 402. Server 102 also comprises the following components, all of which are coupled to processor 402: a network interface 404 that enables server 102 to communicate via internal network 112 and via network 104, a port 406 through which server 102 can communicate with terminal 130, a port 408 through which server 102 can communicate with smart card reader 134, and a memory 410.

Although the following example description enables the functionality of server 102 through code executable by processor 402, it will be appreciated by persons of ordinary skill in the art that equivalent implementations may use any combination of hardware, software and firmware.

Memory 410 may store application code 412 which, when executed by processor 402, provides an application with a user interface to terminal 130 through which a user of terminal 130 such as a system administrator can configure server 102 and can cause processor 402 to execute code.

Memory 410 may store database code 414 which, when executed by processor 402, causes server 102 to interface with device database 128.

Memory 410 may store a pool 416 of unassigned access credentials. Memory 410 may store credentials import code 418 which, when executed by processor 402, causes server 102 to import unassigned access credentials from an external source into pool 416.

Memory 410 may optionally store access credential assignment data 420, for example, records in the form UserID-Credential. Memory 410 may store access system interface code 422 which, when executed by processor 402, causes server 102 to inform access system 150 of the assignment of an access credential to a specific individual.

Server 102 is able to implement push technology 430 to push data such as IT policies 432, access credentials and other information to mobile communication devices.

Memory 410 may store access credential selection, assignment and distribution code 434 which, when executed by processor 402, causes server 102 to select an access credential from pool 416, assign the access credential to a specific individual, identify a mobile communication device associated with the specific individual, and push, using push technology 430 and network interface 404, the access credential to the mobile communication device.

Memory 410 of server 102 is able to store additional information to enable creation of a secure authenticated channel with a mobile communication device, such as mobile communication device 110. For example, memory 410 is able to store a network identification 434 and a password 436 to be used in an authentication procedure with mobile communication device 110. Memory 410 is also able to store a private key 438 of server 102, a public key 440 of server 102 that forms a public-private key pair with private key 438, and a public key 442 of mobile communication device 110. Device public key 442 is to be used to encrypt messages transmitted to mobile communication device 110, and server private key 438 is to be used to decrypt messages received from mobile communication device 110. Server public key 440 is to be transmitted to mobile communication device 110 so that mobile communication device 110 can encrypt messages to be transmitted to server 102. Other functionality of server 102 is not explicitly shown in FIG. 4.

Figures 1, 5:
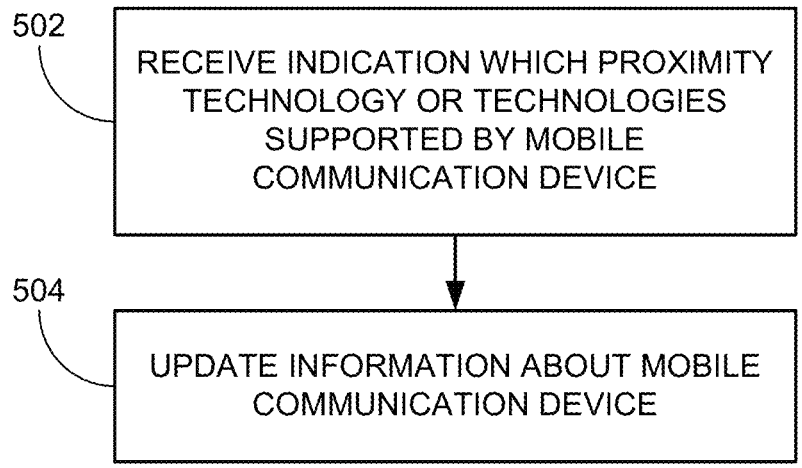
Figures 2, 5:
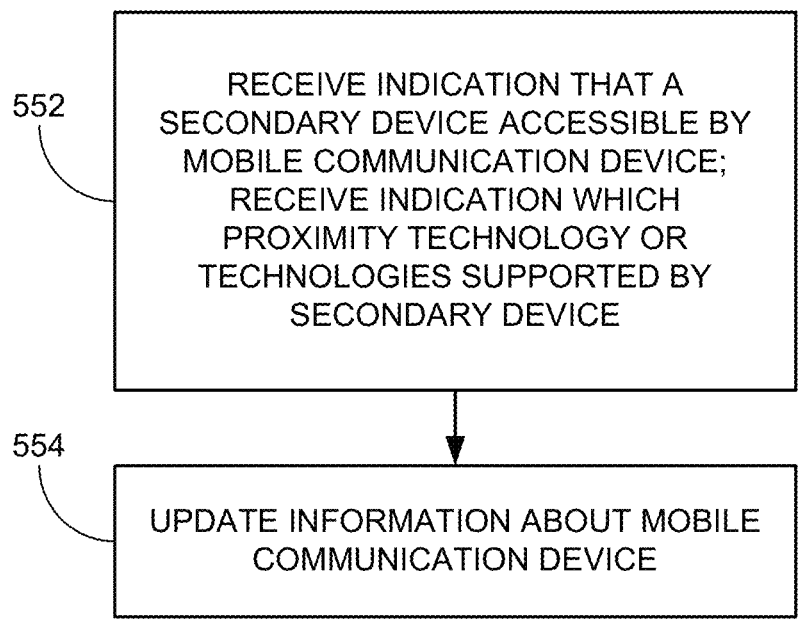

FIGS. 5-1 and 5-2 are illustrations of example methods to be performed by a server, for example, server 102, in communication with a mobile communication device, for example, mobile communication device 110.

At 502, the server receives from the mobile communication device over a secure and authenticated channel an indication of which proximity technology or technologies the mobile communication device supports. At 504, the server updates its information about the mobile communication device, for example, by adding or updating records in device database 128 related to the mobile communication device. The proximity technology or technologies supported by mobile communication devices may be identified in device database 128, for example, in records in the form DeviceID-DeviceCapability.

At 552, the server receives from the mobile communication device over a secure and authenticated channel an indication that a secondary device is accessible by the mobile communication device and an indication of which proximity technology or technologies the secondary device supports. At 554, the server updates its information about the mobile communication device, for example, by adding or updating records in device database 128 related to the mobile communication device. The proximity technology or technologies supported by secondary devices accessible by mobile communication devices may be identified in device database 128, for example, in records in the form DeviceID-SecondaryDeviceCapability.

Figure 6:
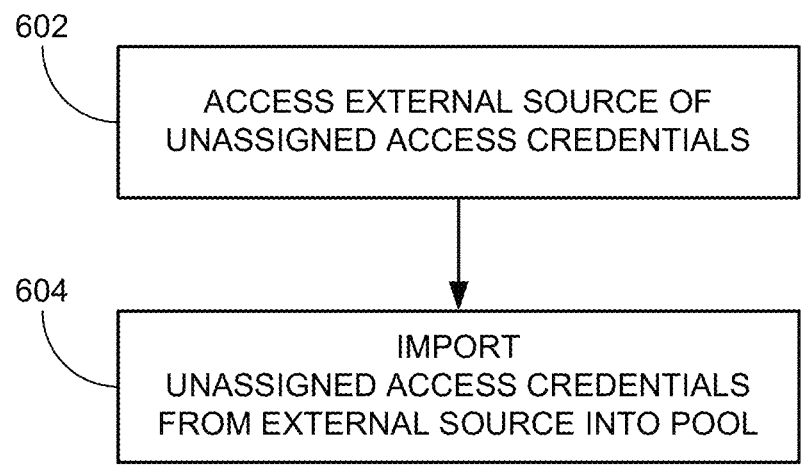
FIG. 6 is an illustration of an example method to be performed by a server.

FIG. 6 is a flowchart illustration of an example method to be performed by a server, for example, server 102. The method illustrated in FIG. 6 may be performed by execution of credentials import code 418.

At 602, the server accesses an external source of unassigned access credentials. For example, server 102 may access smart card reader 134 via port 408. Server 102 may store a driver for smart card reader 134 and use the driver to cause smart card reader 134 to read unassigned access credentials from smart card 132.

At 604, the server imports unassigned access credentials from the external source into the pool of unassigned access credentials stored in the server.

Figures 1, 7:
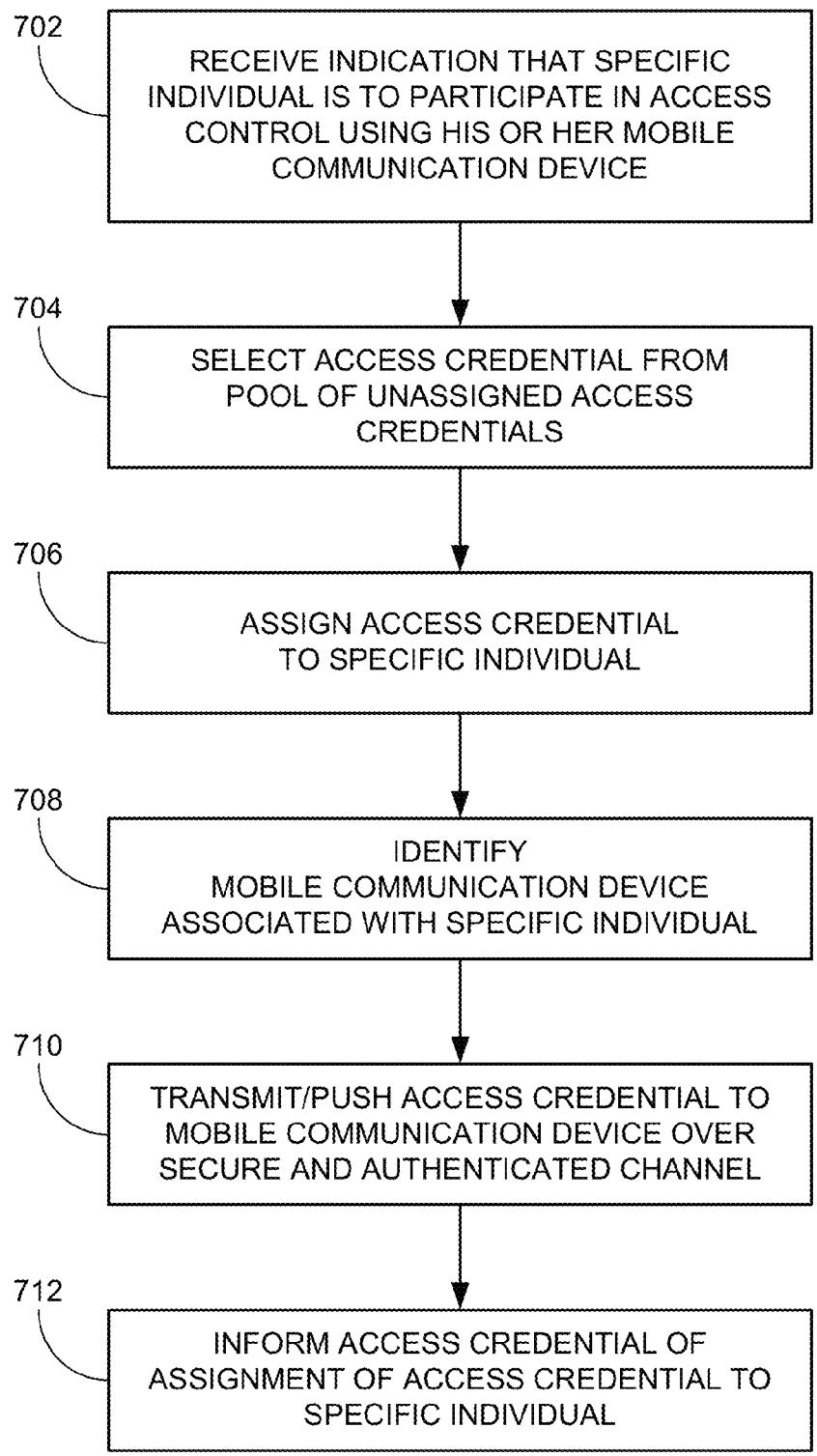
Figures 2, 7:
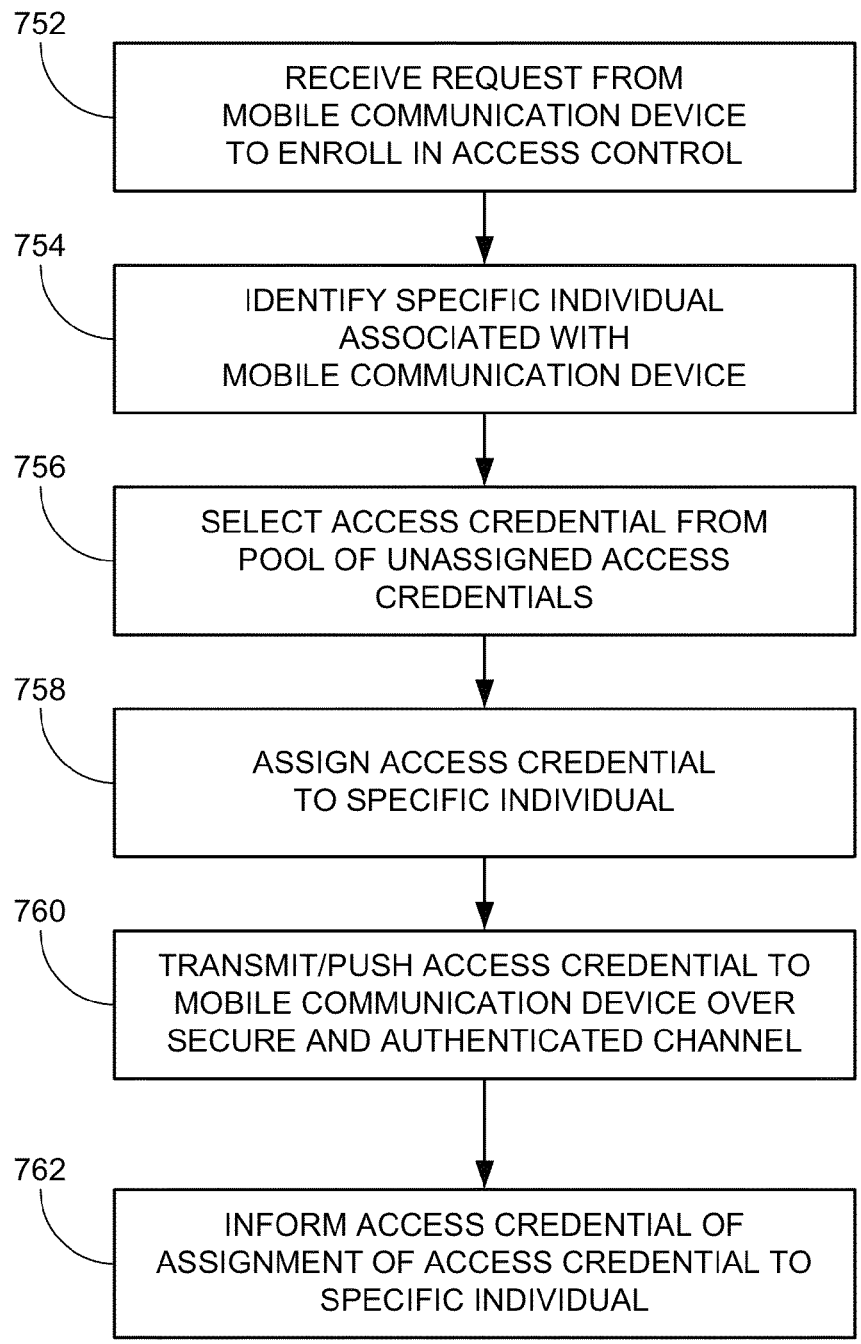

FIG. 7-1 is a flowchart illustration of an example method to be performed by a server, for example, server 102. The method illustrated in FIG. 7-1 may be performed by execution of access credential selection, assignment and distribution code 432, push technology 430 and access system interface code 422.

At 702, the server is configured by a system administrator (via a terminal) that a specific individual is to participate in access control using its associated mobile communication device. The specific individual may be identified by its UserID. Alternatively, a group in which the specific individual is included may be identified by its GroupID, and the server may have access to the UserIDs of all individuals who are included in the group.

At 704, the server selects an access credential from its pool of unassigned access credential. It doesn't matter which access credential the server selects from the pool, as long as the access credential is unassigned at the time of its selection.

At 706, the server assigns the access credential that was selected at 704 to the specific individual. This may involve the server generating a record of the form UserID-Credential.

At 708, the server identifies a mobile communication device that is associated with the specific individual and is to receive the access credential. If more than one mobile communication device is associated with the specific individual, then various options are possible. For example, the same access credential may be pushed to all mobile communication devices associated with the specific individual. In another example, the specific individual may specify which of his or her mobile communication devices is to receive the access credential. In a further example, the system administrator may choose which of the mobile communication devices is to receive the access credential. In yet another example, the most secure of the mobile communication devices is automatically selected to receive the access credential. The determination of which mobile communication device is most secure may depend upon any or a combination of (a) the type of device, (b) the security policies assigned, and (c) the security certification(s) on the device.

The identification of the mobile communication device that is associated with the specific individual may occur prior to, concurrently with, or after the selection and assignment of the access credential.

At 710, the server pushes the access credential that was selected at 704 and assigned at 706 to the mobile communication device that was identified at 708. The server pushes the access credential to the mobile communication device over a secure and authenticated channel such that the access credential is receivable by the mobile communication device. The mobile communication device may receive the access credential from a base station, for example, base station 108, that is coupled via a network, for example, network 104, to the server. Alternatively, the mobile communication device may receive the access credential from an access point that is coupled via a network to the server. Alternatively, the mobile communication device may receive the access credential from a personal computer that is coupled via a network to the server. Communications between the personal computer and the mobile communication device may be accomplished via a wireless personal area network or via a wired connection, for example, a universal serial bus (USB) connection. The computer may have installed thereon an application that acts as an intermediary between the mobile communication device and the server and facilitates communication therebetween. Since the access credential is pushed by the server to the mobile communication device, the transmission of the access credential is initiated by the server and is not explicitly requested by the mobile communication device.

At 712, the server synchronizes the selected access credential and its assignment to the specific individual with an access control database. The synchronization may occur prior to, concurrently with, or after the access credential is pushed to the mobile communication device.

If the specific individual is one of a group identified by its GroupID, then actions 704-712 may be repeated by the server for other individuals included in the group.

Thus far, the system and methods described herein have described a server pushing an access credential to a mobile communication device. It is also contemplated that the mobile communication device may request an access credential from the server. For example, an enrollment application may be installed on the mobile communication device which enables a request to participate in access control to be sent to the server. FIG. 7-2 is a flowchart illustration of an example method to be performed by a server, for example, server 102. The method illustrated in FIG. 7-2 may be performed by execution of access credential selection, assignment and distribution code 432, push technology 430 and access system interface code 422.

At 752, the server receives a request from the mobile communication device to enroll in access control. The request may include an identifier of the mobile communication device, for example, its DeviceID.

At 754, the server identifies the specific individual who is associated with the mobile communication device from which the request was received.

At 756, the server selects an access credential from its pool of unassigned access credential. It doesn't matter which access credential the server selects from the pool, as long as the access credential is unassigned at the time of its selection.

The identification of the specific individual that is associated with the mobile communication device may occur prior to, concurrently with, or after the selection of the access credential.

At 758, the server assigns the access credential that was selected at 756 to the specific individual. This may involve the server generating a record of the form UserID-Credential.

At 760, the server transmits the access credential that was selected at 756 and assigned at 758 to the mobile communication device from which the request was received at 752. The server transmits the access credential to the mobile communication device over a secure and authenticated channel such that the access credential is receivable by the mobile communication device. The mobile communication device may receive the access credential from a base station, for example, base station 108, that is coupled via a network, for example, network 104, to the server. Alternatively, the mobile communication device may receive the access credential from an access point that is coupled via a network to the server. Alternatively, the mobile communication device may receive the access credential from a personal computer that is coupled via a network to the server. Communications between the personal computer and the mobile communication device may be accomplished via a wireless personal area network or via a wired connection, for example, a universal serial bus (USB) connection. The computer may have installed thereon an application that acts as an intermediary between the mobile communication device and the server and facilitates communication therebetween.

At 762, the server synchronizes the selected access credential and its assignment to the specific individual with an access control database. The synchronization may occur prior to, concurrently with, or after the access credential is transmitted to the mobile communication device.

Figure 8:
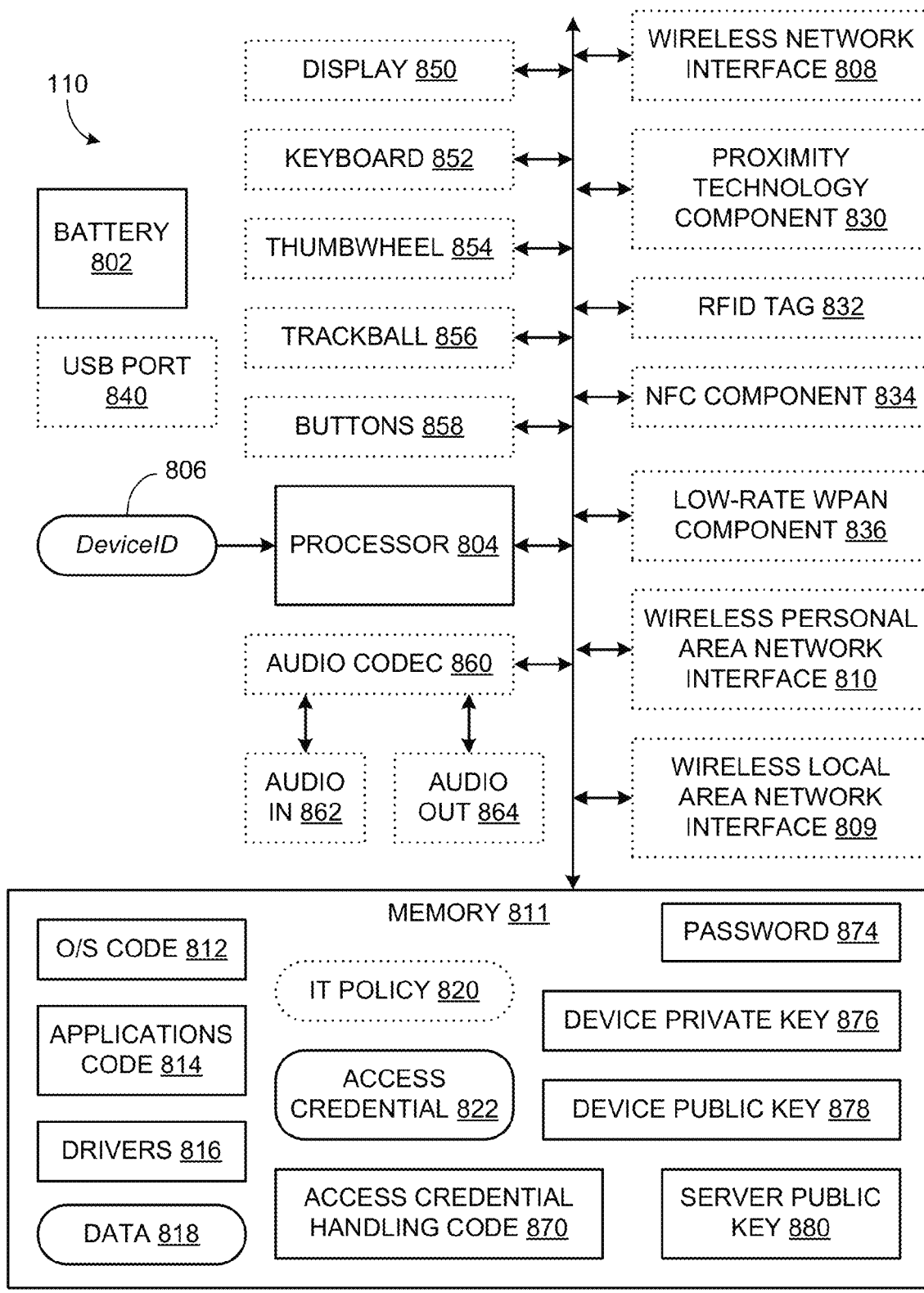
FIG. 8 is an example block diagram of a mobile communication device.

FIG. 8 is an example block diagram of mobile communication device 110. A battery 802 or other power source is used to power other components of mobile communication device 110. Mobile communication device 110 comprises a processor 804. A component 806 stores an identifier DeviceID of mobile communication device 110. A hardware register is an example of component 806. Processor 804 is able to read the identifier from component 806.

If used in the system illustrated in FIG. 1-1, mobile communication device 110 comprises a wireless network interface 808, which is coupled to processor 804. Wireless network interface 808 is compatible with the wireless network to which base station 112 belongs and enables mobile communication device 110 to communicate with base station 112 when within range of base station 112.

If used in the system illustrated in FIG. 1-2, mobile communication device 110 comprises a WLAN interface 809, which is coupled to processor 804. WLAN interface 809 is compatible with WLAN access point 116 and enables mobile communication device to communicate with WLAN access point 116 when within range of WLAN access point 116.

If used in the system illustrated in FIG. 1-3, mobile communication device 110 comprises a WPAN interface 810, which is coupled to processor 804. WPAN interface 810 is compatible with the WPAN device, for example, personal computer 120, and enables mobile communication device 110 to communicate with personal computer 120 when within range of personal computer 120.

Mobile communication device 110 comprises a memory 811, which is coupled to processor 804. Memory 811 may store code executable by processor 804, in the form of firmware or software or any combination thereof. For example, memory 811 may store operating system code 812, applications code 814, and drivers 816. Memory 811 may also store data 818 used in the operation of the code or generated by the code when the code is executed by processor 804. Memory 811 is able to store an IT policy 820 received by mobile communication device 110. For example, IT policy 820 may require successful user authentication before a proximity technology can be employed to present an access credential to an access node.

Memory 811 is able to store an access credential 822 transmitted to mobile communication device 110 by server 102.

Memory 811 of mobile communication device 110 is able to store additional information to enable creation of a secure and authenticated channel with a server, such as server 102. For example, memory 811 is able to store a password 874 to be used in an authentication procedure with server 102. Memory 811 is also able to store a private key 876 of mobile communication device 110, a public key 878 of mobile communication device 110, and a public key 880 of server 102. Server public key 880 is to be used to encrypt messages transmitted to server 102, and device private key 876 is to be used to decrypt messages received from server 102. Device public key 878 is to be transmitted to server 102 so that server 102 can encrypt messages to be transmitted to mobile communication device 110. As described herein, mobile communication device 110 may optionally support one or more proximity technologies. In that case, mobile communication device 110 comprises at least one proximity technology component 830. For example, mobile communication device 110 may optionally comprise an RFID tag 832, or an NFC component 834, or an LR-WPAN component 836, or WPAN interface 810, or any combination thereof.

As described herein, mobile communication device 110 may optionally be able to communicate with a secondary device. If the communication is accomplished via WPAN communications, then mobile communication device 110 comprises WPAN interface 810. If the communication is accomplished via a direct wired USB connection, then mobile communication device 110 comprises a USB port 840.

Mobile communication device 110 may optionally comprise various input/output components coupled to processor 804, for example, any one or more of the following: a display 850, a keyboard 852, a thumbwheel 854, a trackball 856, one or more buttons 858, an audio codec 860, an audio input component 862 and an audio output component 864. A touchscreen is an example of display 850. Mobile communication device 110 may comprise other components that, for the sake of clarity, are not illustrated in FIG. 8.

Memory 811 may store access credential handling code 870 which, when executed by processor 804, enable mobile communication device 110 to perform methods described herein.

Figure 9:
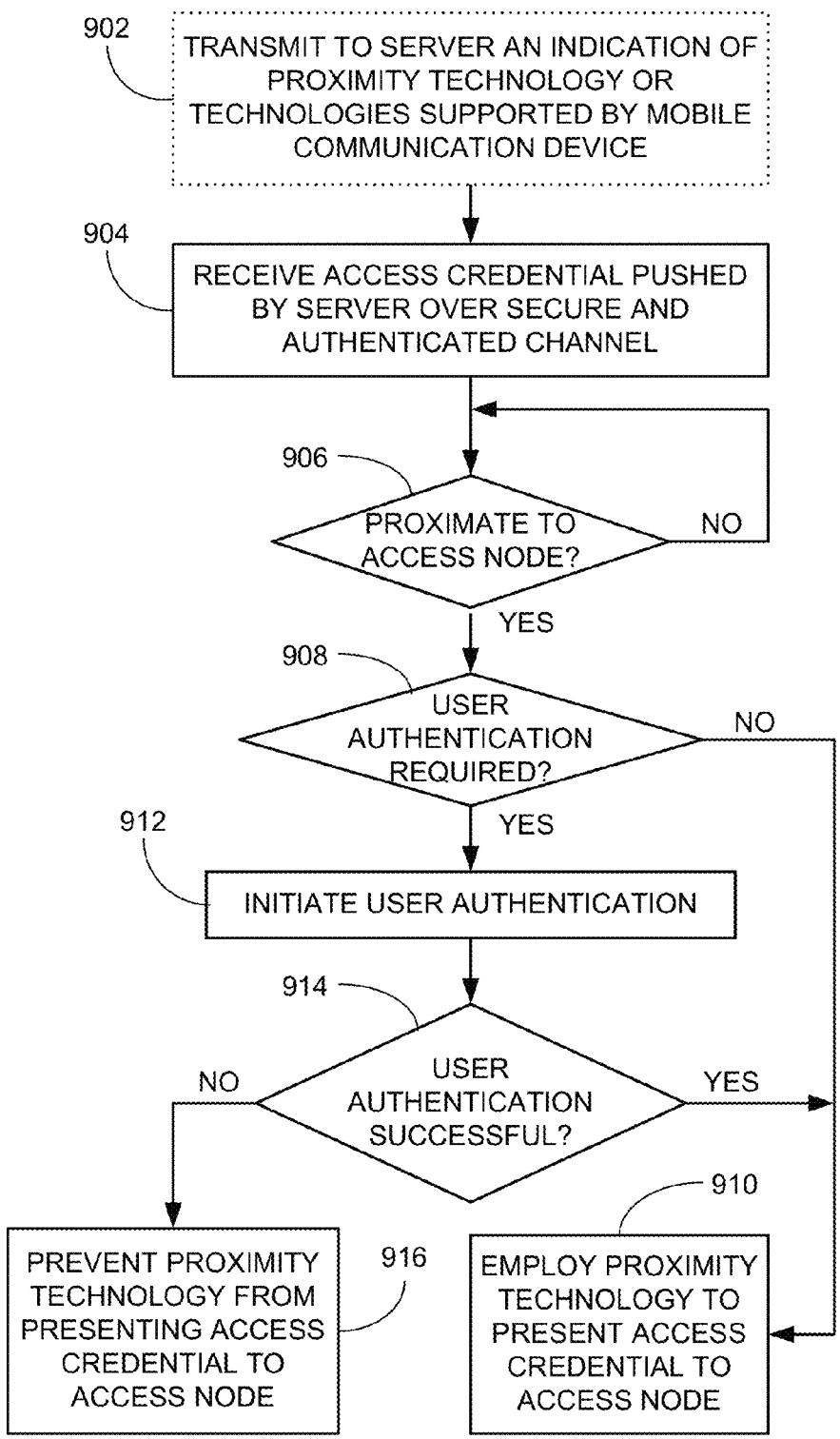
FIG. 9 is an illustration of an example method to be performed by a mobile communication device that supports a proximity technology.

FIG. 9 is an illustration of an example method to be performed by mobile communication device 110 in the case where mobile communication device 110 supports one or more proximity technologies.

Optionally, at 902, mobile communication device 110 transmits an indication of which proximity technology or technologies it supports over the secure and authenticated channel to server 102.

At 904, mobile communication device 110 receives an access credential transmitted to it by server 102 over a secure and authenticated channel. If the access credential is pushed by server 102, it is contemplated that transmission of the indication at 902, if it occurs, takes place before the access credential is pushed by server 102, since that latter action is expected to be triggered only after a system administrator indicates to server 102 that the specific individual with which mobile communication device 110 is associated is to participate in access control. If the access credential is transmitted by server 102 to mobile communication device 110 in response to receiving a request for the access credential, it is contemplated that the request also includes the indications described with respect to 902. As a further alternative, mobile communication device 110 may receive the access credential in response to polling server 102.

The rest of the method is not performed unless mobile communication device 110 is proximate to an access node that supports the same proximity technology that is supported by mobile communication device 110, which is checked at 906.

At 908, mobile communication device 110 checks whether successful user authentication is required in order to employ the proximity technology to present the access credential. If not, then mobile communication device 110 employs the proximity technology to present the access credential to the access node at 910. If successful user authentication is required, then at 912, mobile communication device 110 initiates the user authentication. If the user authentication is successful, as checked at 914, mobile communication device 110 employs the proximity technology to present the access credential to the access node at 910. If the user authentication is not successful, mobile communication device prevents at 916 the proximity technology from presenting the access credential to the access node.

Figure 10:
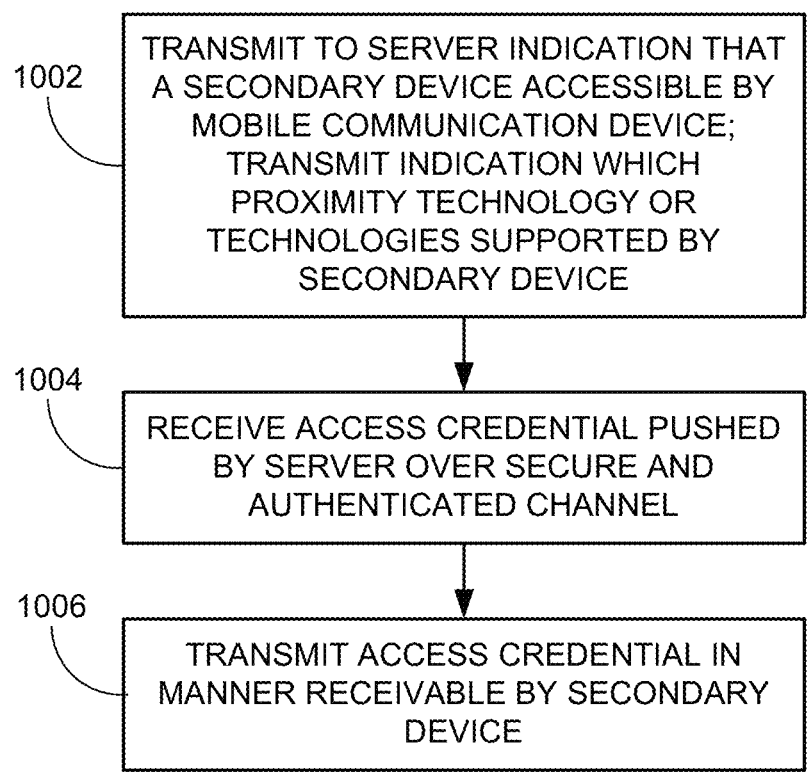
FIG. 10 is an illustration of an example method to be performed by a mobile communication device that can access a secondary device, where the secondary device supports a proximity technology.

FIG. 10 is an illustration of an example method to be performed by mobile communication device 110 in the case where mobile communication device 110 is able to access secondary device 160 and secondary device 160 supports a proximity technology.

At 1002, mobile communication device 110 transmits, over the secure and authenticated channel to server 102, an indication that a secondary device is accessible by the mobile communication device and an indication of the proximity technology or technologies supported by the secondary device.

At 1004, mobile communication device 110 receives an access credential transmitted to it by server 102 over a secure and authenticated channel. If the access credential is pushed by server 102, it is contemplated that transmission of the indication at 1002, if it occurs, takes place before the access credential is pushed by server 102, since that latter action is expected to be triggered only after a system administrator indicates to server 102 that the specific individual with which mobile communication device 110 is associated is to participate in access control. If the access credential is transmitted by server 102 to mobile communication device 110 in response to receiving a request for the access credential, it is contemplated that the request also includes the indications described with respect to 1002. As a further alternative, mobile communication device 110 may receive the access credential in response to polling server 102.

At 1006, mobile communication device 110 transmits the access credential in a manner receivable by the secondary device.

Figure 11:
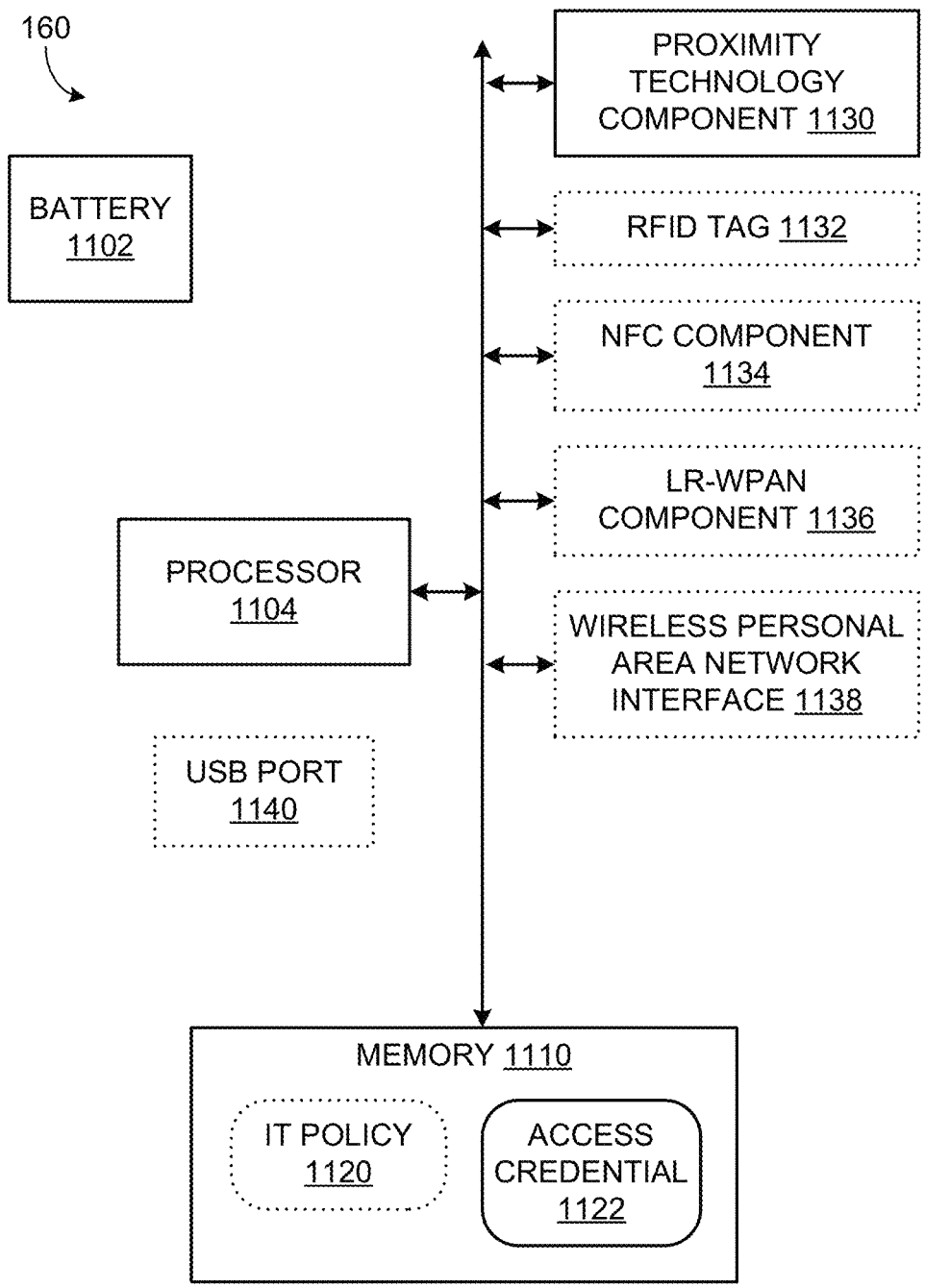
FIG. 11 is an example block diagram of a secondary device.

FIG. 11 is an example block diagram of secondary device 160.

A battery 1102 or other power source is used to power other components of secondary device 160. Secondary device 160 comprises a processor 1104.

Secondary device 160 comprises a memory 1110, which is coupled to processor 1104. Memory 1110 may store code executable by processor 1104, in the form of firmware or software or any combination thereof. Memory 1110 is able to store an IT policy 1120 received by mobile communication device 110 from server 102 and forwarded to secondary device 160. For example, IT policy 1120 may require successful user authentication before a proximity technology can be employed to present an access credential to an access node.

Memory 1110 is able to store an access credential 1122 received at mobile communication device 110 from server 102 and subsequently transmitted by mobile communication device 110 to secondary device 160.

As described herein, secondary device 160 supports one or more proximity technologies. Accordingly, secondary device 160 comprises at least one proximity technology component 1130. For example, secondary device 160 may optionally comprise an RFID tag 1132, or an NFC component 1134, or an LR-WPAN component 1136, or a WPAN interface 1138, or any combination thereof.

As described herein, secondary device 160 is able to communicate with a mobile communication device. If the communication is accomplished via WPAN communications, then secondary device 160 comprises WPAN interface 1138. If the communication is accomplished via a direct USB connection, then secondary device 160 comprises a USB port 1140.

While certain features have been illustrated and described herein, many modifications, substitutions, changes, and equivalents will now occur to those of ordinary skill in the art without departing from the fair meaning of the accompanying claims.

What is claimed is:

1. A method comprising:
   selecting an access credential from a pool of unassigned access credentials;
   assigning the access credential to a specific individual;
   transmitting the access credential over a secure and authenticated channel to a mobile communication device that is associated with the specific individual, such that the access credential is receivable by the mobile communication device; and
   receiving from the mobile communication device an indication that a secondary device is accessible by the mobile communication device and an indication of the proximity technology or technologies supported by the secondary device, wherein the access credential is intended for use by the secondary device.

2. The method as claimed in claim 1, further comprising:
   importing one or more of the unassigned access credentials into the pool from an external source of unassigned access credentials.

3. The method as claimed in claim 1, further comprising:
   informing an access system of the assignment of the access credential to the specific individual.

4. The method as claimed in claim 1, wherein transmitting the access credential to the mobile communication device over the secure and authenticated channel comprises pushing the access credential to the mobile communication device over the secure and authenticated channel.

5. The method as claimed in claim 1, further comprising:
   receiving from the mobile communication device an indication of the proximity technology or technologies supported by the mobile communication device.

6. The method as claimed in claim 1, further comprising:
identifying the mobile communication device.

7. The method as claimed in claim 1, further comprising:
receiving a request to participate in access control from the mobile communication device; and
identifying the specific individual that is associated with the mobile communication device;
wherein transmitting the access credential to the mobile communication device over the secure and authenticated channel occurs in response to receiving the request.

8. The method as claimed in claim 1, wherein the access credential is a physical access credential.

9. The method as claimed in claim 1, wherein the access credential is a logical access credential.

10. The method as claimed in claim 2, wherein the external source comprises a smart card and importing the one or more unassigned access credentials comprises accessing the smart card via a smart card reader.

11. A method for a mobile communication device that supports a proximity technology, the method comprising:
receiving from a server over a secure and authenticated channel an access credential assigned to an individual with which the mobile communication device is associated;
when the mobile communication device is proximate to an access node that supports the proximity technology, employing the proximity technology to present the access credential to the access node; and
requiring successful user authentication in order to permit employing the proximity technology to present the access credential to the access node, wherein the successful user authentication involves a biometric of an authorized user of the mobile communication device.

12. The method as claimed in claim 11, further comprising:
prior to receiving the access credential, transmitting to the server an indication of the proximity technology or technologies supported by the mobile communication device.

13. The method as claimed in claim 11, wherein the successful user authentication involves a secret known to an authorized user of the mobile communication device.

14. The method as claimed in claim 11, wherein the proximity technology comprises radio frequency identification.

15. The method as claimed in claim 11, wherein the proximity technology comprises near field communication.

16. A method for a mobile communication device, the method comprising:
transmitting to a server an indication that a secondary device is accessible by the mobile communication device and an indication of the proximity technology or technologies supported by the secondary device;
receiving from the server over a secure and authenticated channel an access credential assigned to an individual with which the mobile communication device is associated, wherein the access credential is intended for use by the secondary device; and
transmitting the access credential in a manner receivable by the secondary device.

17. The method as claimed in claim 16, wherein transmitting the access credential comprises transmitting the access credential via a wireless personal area network interface of the mobile communication device.

18. The method as claimed in claim 16, further comprising:
prior to receiving the access credential, transmitting to the server an indication of the proximity technology or technologies supported by the secondary device.

19. A server comprising:
a network interface;
a processor; and
a memory storing code which, when executed by the processor, causes the server:
to select an access credential from a pool of unassigned access credentials stored in the memory;
to assign the access credential to a specific individual;
to transmit, via the network interface, the access credential over a secure and authenticated channel to a mobile communication device that is associated with the specific individual, such that the access credential is receivable by the mobile communication device; and
to receive from the mobile communication device, via the network interface, an indication that a secondary device is accessible by the mobile communication device and an indication of the proximity technology or technologies supported by the secondary device, wherein the access credential is intended for use by the secondary device.

20. A mobile communication device that supports a proximity technology, the mobile communication device comprising:
a network interface to receive from a server over a secure and authenticated channel an access credential assigned to an individual with whom the mobile communication device is associated;
a processor; and
a memory storing code which, when executed by the processor, causes the mobile communication device, when the mobile communication device is proximate to an access node that supports the proximity technology, to employ the proximity technology to present the access credential to the access node, and requires successful user authentication in order to permit employing the proximity technology to present the access credential to the access node, wherein the successful user authentication involves a biometric of an authorized user of the mobile communication device.

21. A mobile communication device comprising:
a network interface to receive from a server over a secure and authenticated channel an access credential assigned to an individual with whom the mobile communication device is associated and to transmit to the server an indication that a secondary device is accessible by the mobile communication device and an indication of the proximity technology or technologies supported by the secondary device, wherein the access credential is intended for use by the secondary device;
a processor; and
a memory storing code which, when executed by the processor, causes the mobile communication to transmit the access credential in a manner receivable by the secondary device.

22. A system comprising:
a server arranged to store a pool of unassigned access credentials, the server coupled to a network;
a mobile communication device that is able to communicate over a secure and authenticated channel with the server via the network;
an access system comprising an access node that supports a proximity technology and controls access to a controlled element; and
a secondary device that supports the proximity technology and that is accessible by the mobile communication device, wherein the mobile communication device is arranged to transfer the access credential to the secondary device, and wherein the secondary device is arranged to employ the proximity technology to present the access credential to the access node when the secondary device is proximate to the access node.

\* \* \* \* \*

UNITED STATES PATENT AND TRADEMARK OFFICE
CERTIFICATE OF CORRECTION

| | | |
|---|---|---|
| PATENT NO. | : 8,819,792 B2 | Page 1 of 1 |
| APPLICATION NO. | : 13/093898 | |
| DATED | : August 26, 2014 | |
| INVENTOR(S) | : Neil Patrick Adams | |

It is certified that error appears in the above-identified patent and that said Letters Patent is hereby corrected as shown below:

In the Drawings

In FIG. 7-1, the box 712 should read "INFORM ACCESS CONTROL DATABASE OF ASSIGNMENT OF ACCESS CREDENTIAL TO SPECIFIC INDIVIDUAL".

In FIG. 7-2, the box 762 should read "INFORM ACCESS CONTROL DATABASE OF ASSIGNMENT OF ACCESS CREDENTIAL TO SPECIFIC INDIVIDUAL".

Signed and Sealed this
Thirtieth Day of December, 2014

Michelle K. Lee
*Deputy Director of the United States Patent and Trademark Office*